(12) United States Patent
Miller et al.

(10) Patent No.: US 10,945,329 B2
(45) Date of Patent: *Mar. 9, 2021

(54) NON-PLANAR VOLTAGE MULTIPLIER

(71) Applicant: Moxtek, Inc., Orem, UT (US)

(72) Inventors: Eric Miller, Provo, UT (US); David S. Hoffman, Draper, UT (US); Vincent F. Jones, Cedar Hills, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/668,897

(22) Filed: Oct. 30, 2019

(65) Prior Publication Data

US 2020/0068693 A1  Feb. 27, 2020

Related U.S. Application Data

(63) Continuation of application No. 16/142,334, filed on Sep. 26, 2018, now Pat. No. 10,499,484.

(60) Provisional application No. 62/587,147, filed on Nov. 16, 2017.

(51) Int. Cl.
  *H05G 1/10* (2006.01)
  *H02M 7/10* (2006.01)
  *H01J 35/02* (2006.01)
  *H05G 1/06* (2006.01)

(52) U.S. Cl.
  CPC ............. *H05G 1/10* (2013.01); *H01J 35/025* (2013.01); *H02M 7/106* (2013.01); *H05G 1/06* (2013.01)

(58) Field of Classification Search
  CPC . H05G 1/10; H05G 1/06; H02M 7/106; H01J 35/025
  See application file for complete search history.

(56) References Cited

U.S. PATENT DOCUMENTS

| | | | |
|---|---|---|---|
| 4,995,069 A | 2/1991 | Tanaka | |
| 8,903,047 B1 | 12/2014 | Wang et al. | |
| 9,369,060 B2 | 6/2016 | Mao et al. | |
| 10,499,484 B2 * | 12/2019 | Miller | H01J 35/025 |
| 2009/0010393 A1 | 1/2009 | Klinkowstein et al. | |

(Continued)

FOREIGN PATENT DOCUMENTS

| | | |
|---|---|---|
| JP | 2004281170 | 10/2004 |
| JP | 2008053076 | 3/2008 |

(Continued)

OTHER PUBLICATIONS

Wang, Jianing et al., "Modeling of Parasitic Elements in High Voltage Multiplier Modules," Electrical Power Processing (EPP) Group, Electrical Sustainable Energy Department Delft University of Technology, Copyright © 2014.

*Primary Examiner* — Courtney D Thomas
(74) *Attorney, Agent, or Firm* — Thorpe, North & Western, LLP

(57) ABSTRACT

In order to reduce the amount of electrical insulation needed for voltage isolation of large voltages generated by a voltage multiplier, the voltage multiplier can be shaped to smooth out electric field gradients. The voltage multiplier can comprise multiple sections, each section located in a different plane. The voltage multiplier can comprise a negative voltage multiplier and a positive voltage multiplier, each inclined at different angles with respect to each other. The voltage multiplier can include a curved shape.

20 Claims, 17 Drawing Sheets

(56) References Cited

U.S. PATENT DOCUMENTS

2015/0055747 A1    2/2015   Simon et al.
2015/0139391 A1    5/2015   Luerkens
2017/0251545 A1    8/2017   Klinkowstein et al.

FOREIGN PATENT DOCUMENTS

JP            2015159851     9/2015
WO    WO 2013131628     9/2013

* cited by examiner

NON-PLANAR VOLTAGE MULTIPLIER

CLAIM OF PRIORITY

This is a continuation of U.S. patent application Ser. No. 16/142,334, filed on Sep. 26, 2018, which claims priority to claims priority to U.S. Provisional Patent Application No. 62/587,147, filed on Nov. 16, 2017, which are incorporated herein by reference.

FIELD OF THE INVENTION

The present application is related generally to x-ray sources.

BACKGROUND

Voltage multipliers can generate many kilovolts of voltage differential. In an x-ray source, this voltage differential can be used to cause electrons to emit from a cathode, impede onto an anode, and generate x-rays. Electrical insulation for isolating this voltage differential can be heavy and expensive. The weight of such electrical insulation can be particularly problematic for portable devices (e.g. portable x-ray sources). The size of the electrical insulation can be a problem if the device needs to be inserted into a small location. It would be desirable to reduce the amount of electrical insulation needed for voltage isolation of large voltages generated by voltage multipliers.

SUMMARY

It has been recognized that it would be advantageous to reduce the amount of electrical insulation needed for voltage isolation of large voltages generated by voltage multipliers. The present invention is directed to various embodiments of voltage multipliers that satisfy this need. The voltage multiplier can be shaped to smooth out electric field gradients, resulting in less required electrical insulation.

In one embodiment, the voltage multiplier can comprise a low voltage section located in a first plane and a high voltage section located in a second plane. The first plane and the second plane can form a V-shape.

In another embodiment, the voltage multiplier can comprise a negative voltage multiplier and a positive voltage multiplier. The negative voltage multiplier and the positive voltage multiplier can be inclined at different angles with respect to each other such that a side view of the voltage multipliers forms an X-shape by intersection of planes of the voltage multipliers.

In another embodiment, the voltage multiplier can comprise a first end having a lowest absolute value of voltage and a second end having a highest absolute value of voltage, and a gradually increasing absolute value of voltage from the first end to the second end. The voltage multiplier can also include a curved shape with a direction of the increasing absolute value of voltage wrapping in the curved shape at least partially around a voltage multiplier axis.

BRIEF DESCRIPTION OF THE DRAWINGS (DRAWINGS MIGHT NOT BE DRAWN TO SCALE)

FIG. 1 is a schematic, end-view of a voltage multiplier 10 comprising a low voltage section 11 located in a first plane $P_1$ and a high voltage section 12 located in a second plane $P_2$, the first plane $P_1$ and the second plane $P_2$ forming a V-shape with an angle $A_1$ of a channel of the V-shape, in accordance with an embodiment of the present invention.

FIG. 2 is a schematic perspective-view of voltage multiplier 10 of FIG. 1, in accordance with an embodiment of the present invention.

FIG. 3a is a schematic, end-view of an x-ray source 30a comprising voltage multiplier 10 of FIG. 1, the x-ray source 30a further comprising: (i) an x-ray tube 30 in a channel 19 of the V-shape with an x-ray tube axis 31 aligned with the channel 19 of the V-shape; and (ii) a corona guard 35 with a curved profile wrapping at least partially around the voltage multiplier 10 and the x-ray tube 30; in accordance with an embodiment of the present invention.

FIG. 3b is a schematic, end-view of an x-ray source 30b, similar to x-ray source 30a, but further comprising a voltage sensor 39 on a convex side of the curved profile of the corona guard 35, in accordance with an embodiment of the present invention.

FIGS. 4 & 5 are schematic perspective-views of x-ray sources 40 & 50, similar to x-ray sources 30a & 30b, but without the corona guard 35 and the voltage sensor 39, in accordance with embodiments of the present invention.

FIG. 6 is a schematic, end-view of a voltage multiplier 60, similar to voltage multiplier 10, but further comprising a middle voltage section 61 electrically coupled between the low voltage section 11 and the high voltage section 12, in accordance with an embodiment of the present invention.

FIGS. 7a-b are schematic, end-views of x-ray sources 70a and 70b, similar to the x-ray sources in FIGS. 3a-5, but the V-shape is a primary V-shape, the voltage multiplier 10 is a negative voltage multiplier 76, the low voltage section 11 is a negative low voltage section 71, and the high voltage section 12 is a negative high voltage section 72; the x-ray source further comprising a positive voltage multiplier 86 including a positive low voltage section 81 located in a third plane $P_3$ and a positive high voltage section 82 located in a fourth plane $P_4$, the third plane $P_3$ and the fourth plane $P_4$ forming a secondary V-shape with an angle $A_2$ of an channel 89 of the secondary V-shape; in accordance with embodiments of the present invention.

Figure 10A:
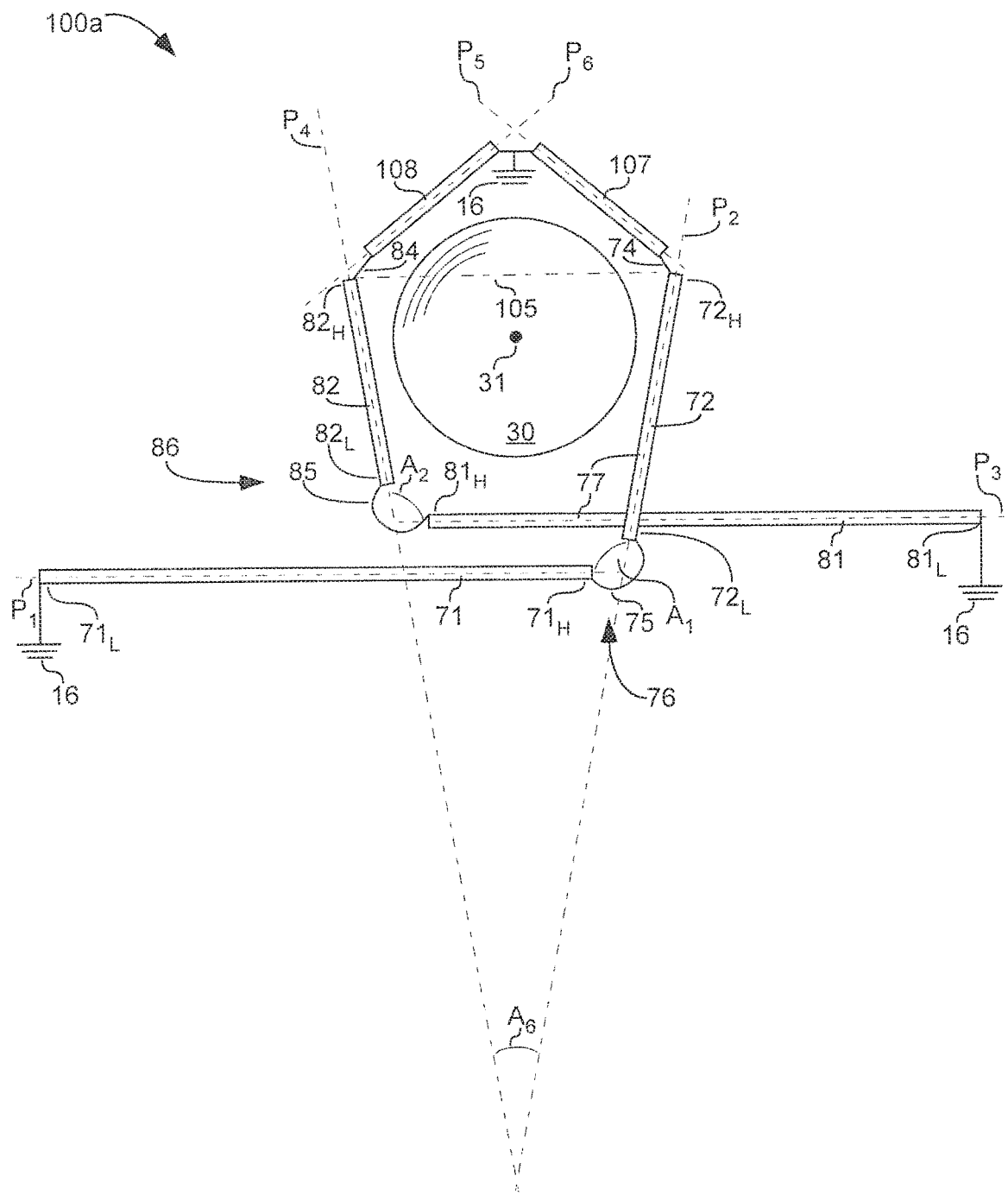
Figure 10B:
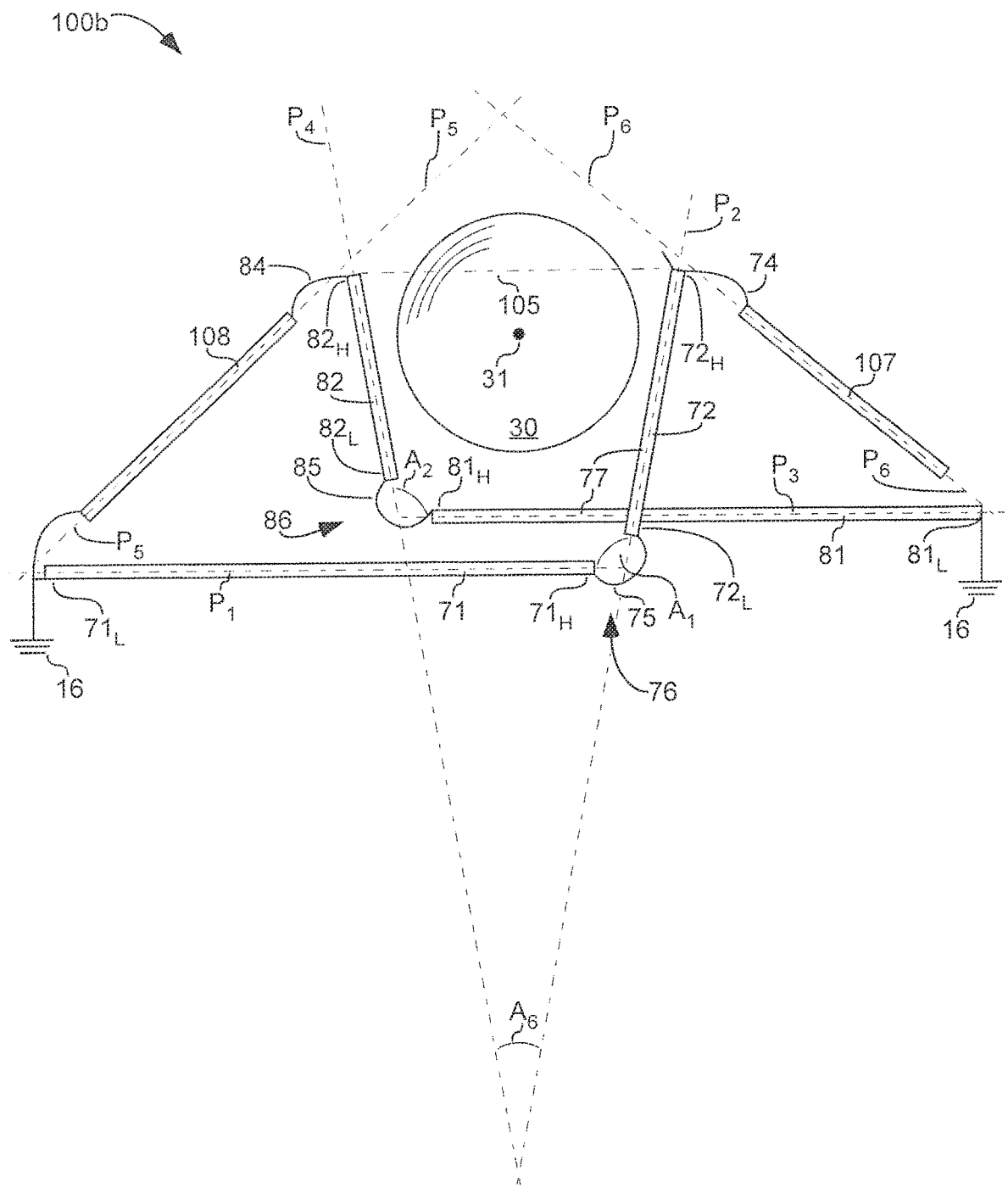

FIGS. 10a-b are schematic, end-view of x-ray sources 100a and 100b, similar to x-ray source 80, but further comprising: (i) an angle $A_6$ between the second plane $P_2$ and the fourth plane $P_4$; (ii) a negative voltage-sensing resistor 107 in a fifth plane $P_5$ and a positive voltage-sensing resistor 108 in a sixth plane $P_6$; and (iii) the first plane $P_1$, the second plane $P_2$, the third plane $P_3$, the fourth plane $P_4$, the fifth plane $P_5$, and the sixth plane $P_6$ encircling the x-ray tube 30; in accordance with embodiments of the present invention.

Figure 11:
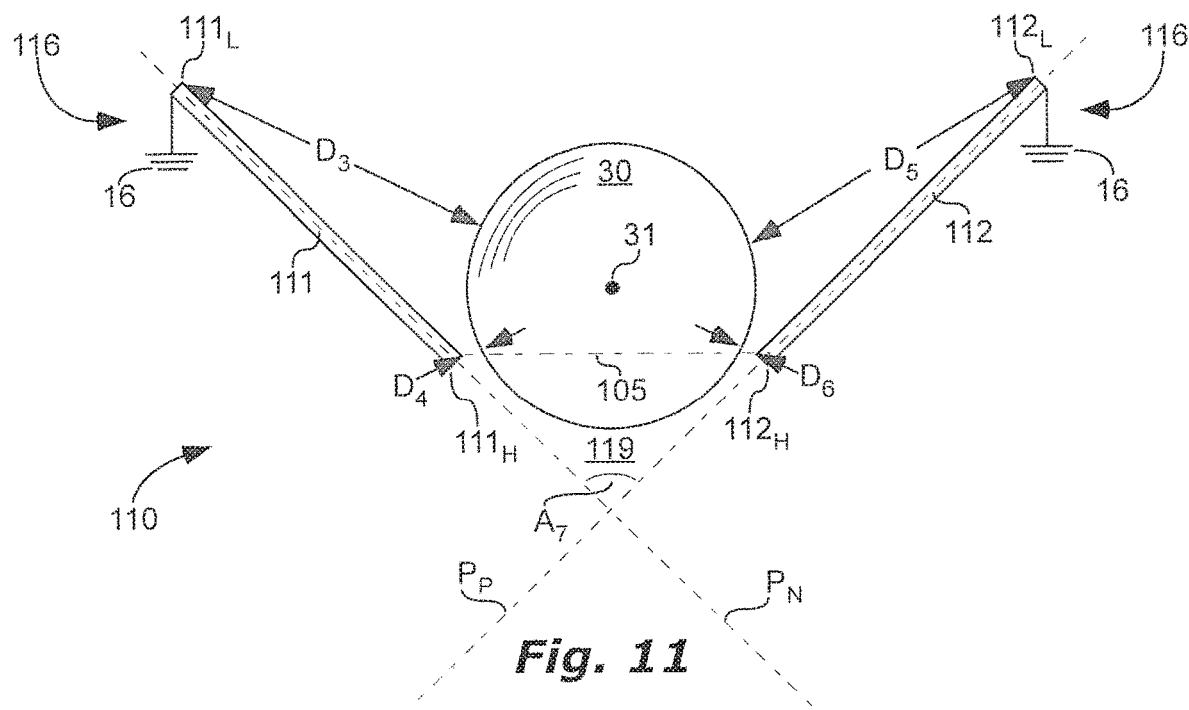

FIG. 11 is a schematic, end-view of x-ray source 110 comprising an x-ray tube 30 and a voltage multiplier 116, the voltage multiplier comprising a negative voltage multiplier 111 and a positive voltage multiplier 112, the negative voltage multiplier 111 and the positive voltage multiplier 112 inclined at different angles with respect to each other such that an end view of the voltage multipliers forms an X-shape by intersection of a plane $P_N$ of the negative voltage multiplier 111 and a plane $P_P$ of the positive voltage multiplier 112, in accordance with an embodiment of the present invention.

Figure 12:
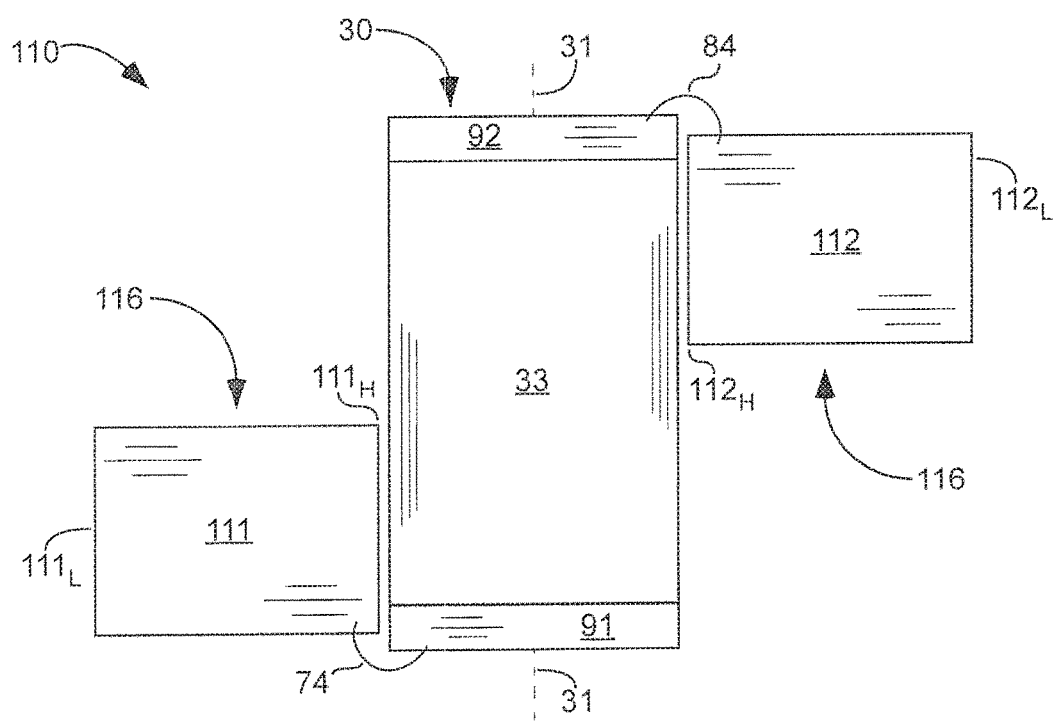

FIG. 12 is a schematic, top-view of x-ray source 110, in accordance with an embodiment of the present invention.

Figure 13:
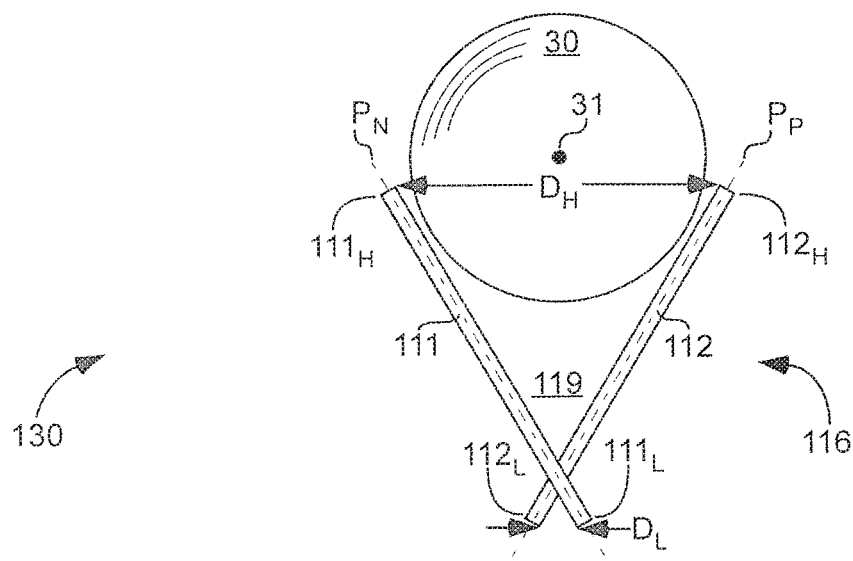

FIG. 13 is a schematic, end-view of an x-ray source 130, similar to x-ray source 110, but further comprising a distance $D_H$ between a positive high voltage end $112_H$ and a negative high voltage end $111_H$ that is larger than a distance $D_L$ between a positive low voltage end $112_L$ and a negative low voltage end $111_L$, in accordance with an embodiment of the present invention.

Figure 14:
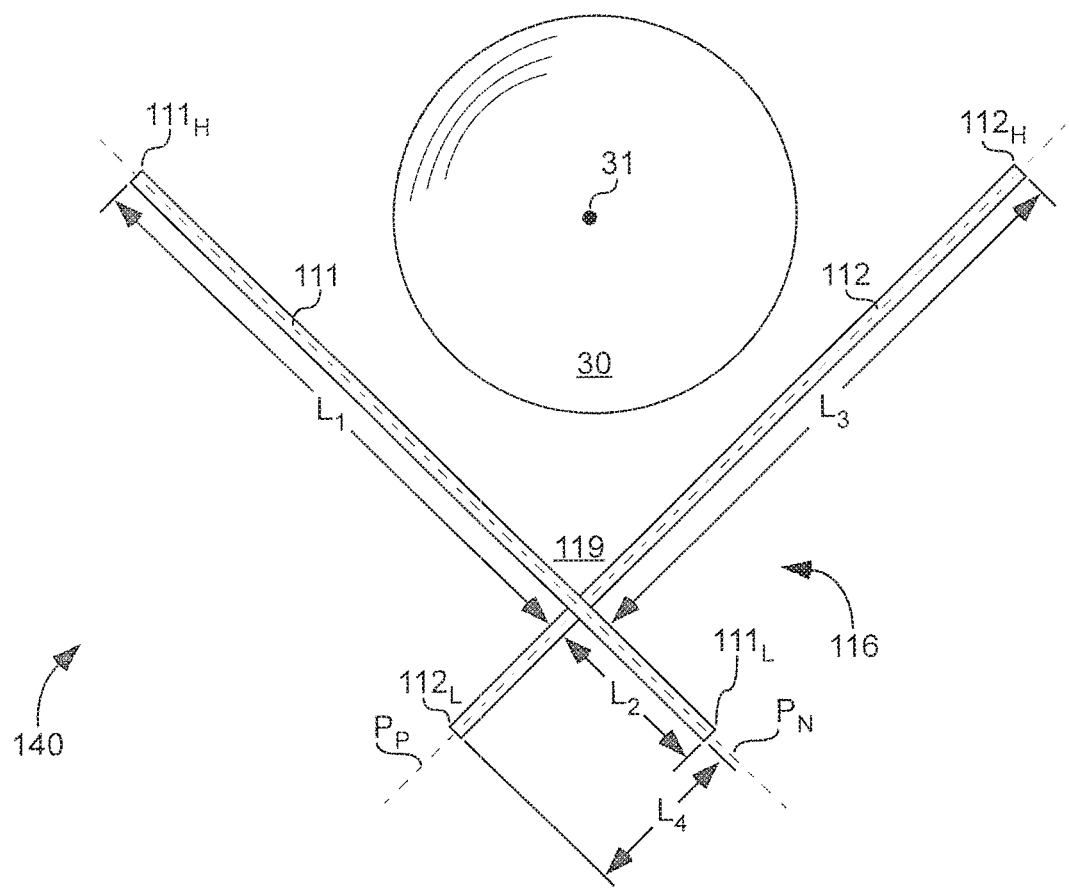

FIG. 14 is a schematic, end-view of an x-ray source 140, similar to x-ray source 110, but further comprising the voltage multipliers 111 and 112 intersecting in the end view, in accordance with an embodiment of the present invention.

Figure 15A:
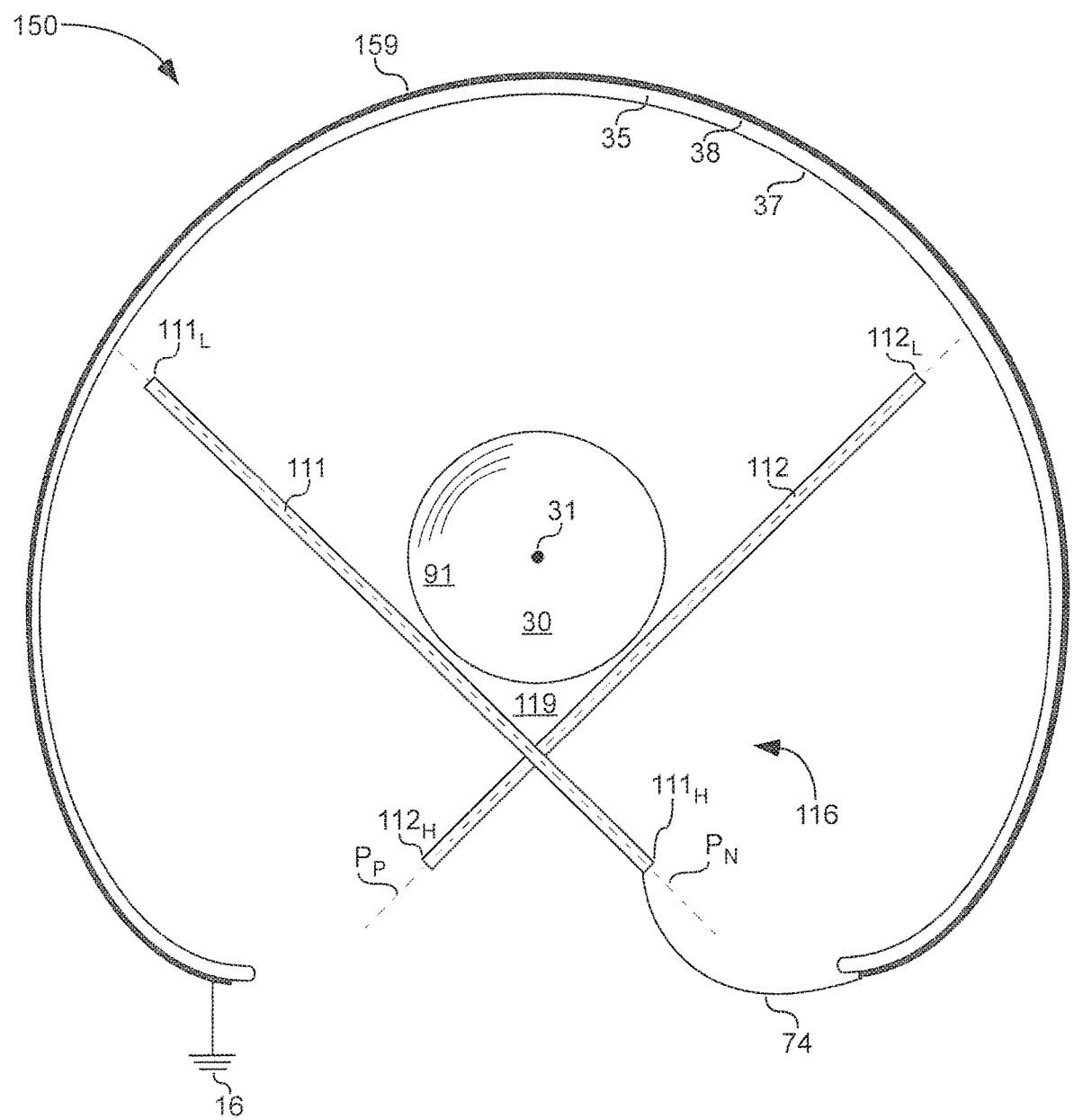

FIG. 15a is a schematic, end-view of an x-ray source 150, similar to x-ray sources 110, 130, and 140, but further comprising: (i) a corona guard 35 with a curved profile wrapping at least partially around the voltage multiplier 116 and the x-ray tube 30; and (ii) a negative voltage sensor 159 electrically coupled to a negative output bias voltage 74 and located on a convex side of the curved profile; in accordance with an embodiment of the present invention.

Figure 15B:
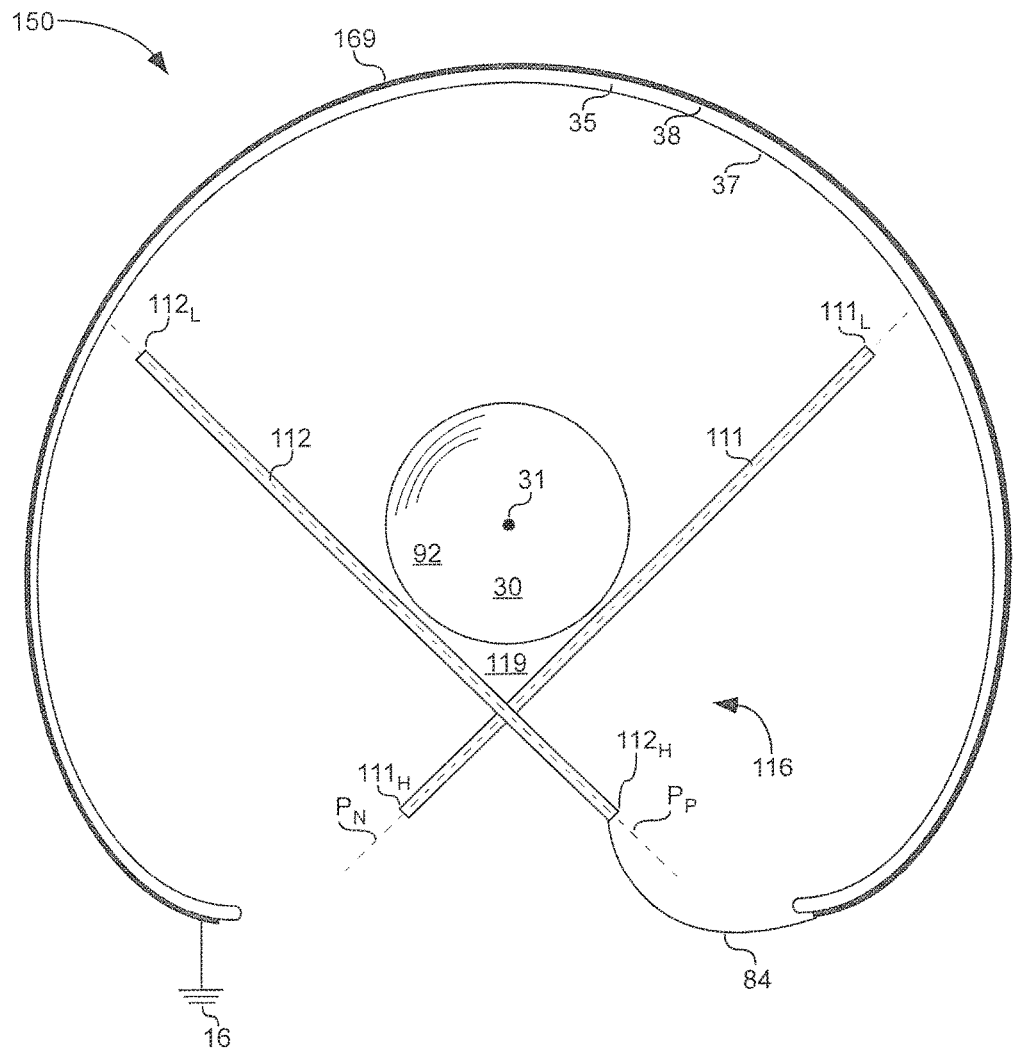

FIG. 15b is a schematic, end-view of x-ray source 150, viewed from an opposite end than shown in FIG. 15a, also showing a positive voltage sensor 169 electrically coupled to a positive output bias voltage 84 and located on the convex side of the curved profile, in accordance with an embodiment of the present invention.

Figure 16:
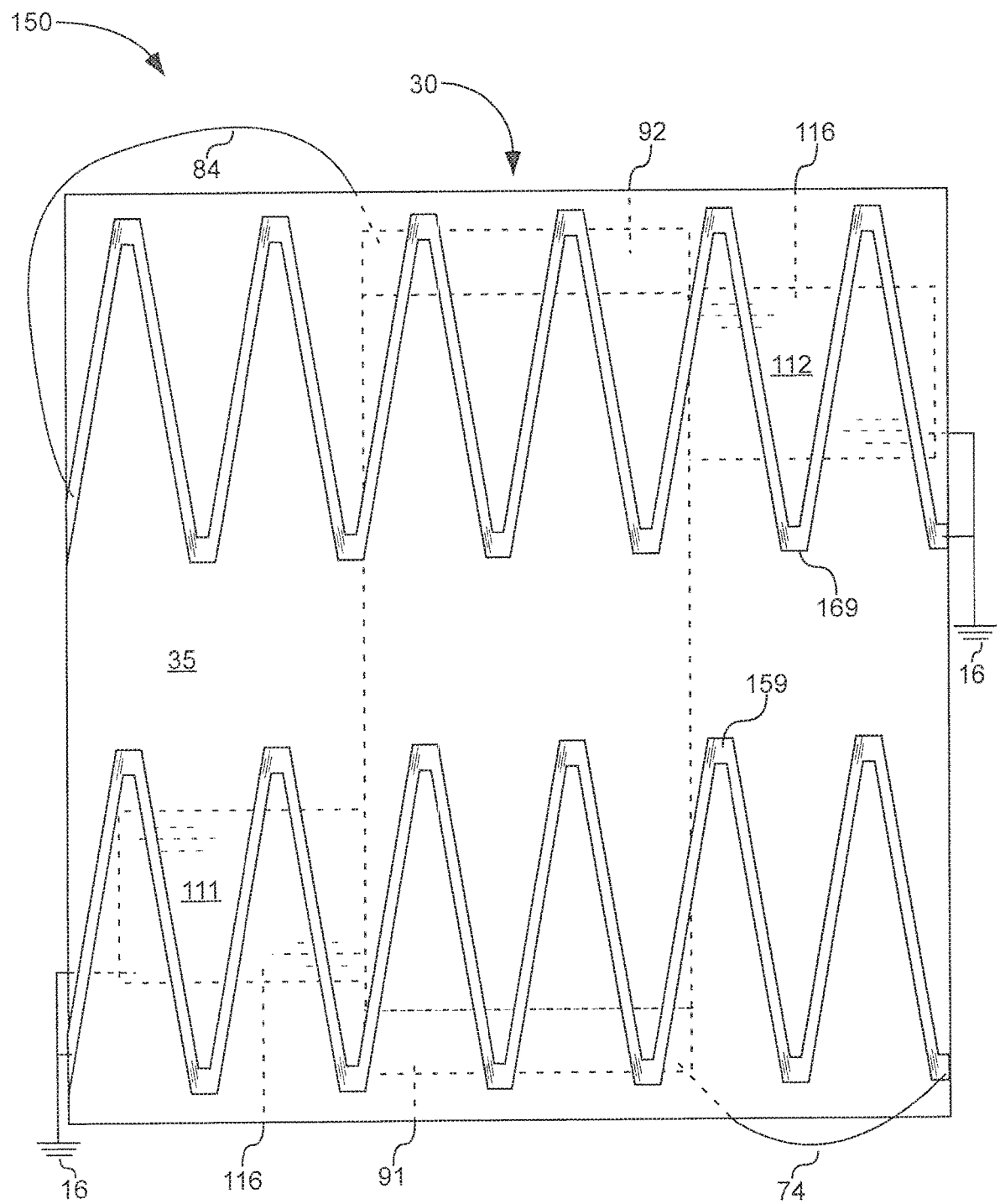

FIG. 16 is a schematic, top-view of x-ray source 150, in accordance with an embodiment of the present invention.

Figure 17A:
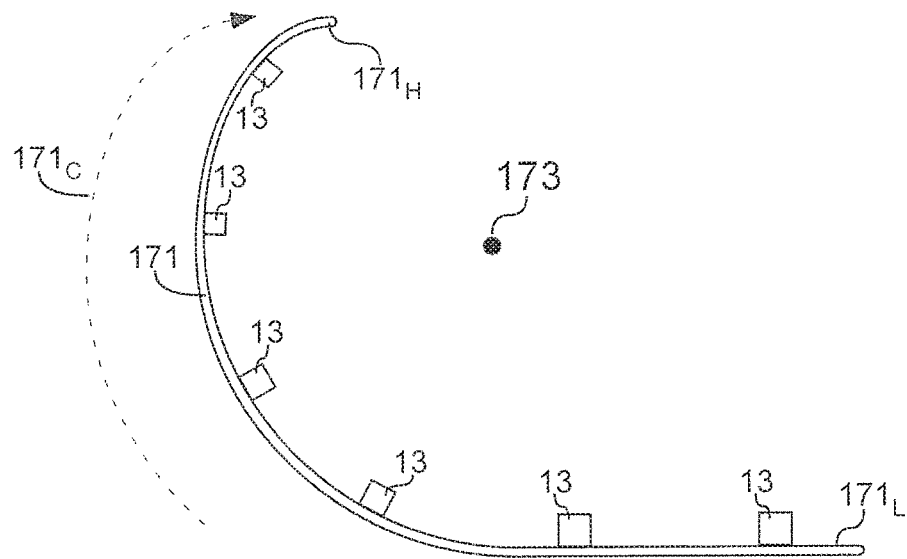

FIG. 17a is a schematic, end-view of a voltage multiplier 171 comprising a first end $171_L$ having a lowest absolute value of voltage and a second end $171_H$ having a highest absolute value of voltage, a gradually increasing absolute value of voltage from the first end $171_L$ to the second end $171_H$, a direction $171_C$ of the increasing absolute value of voltage wrapping in the curved shape at least partially around an axis, defining a voltage multiplier axis 173, in accordance with an embodiment of the present invention.

Figure 17B:
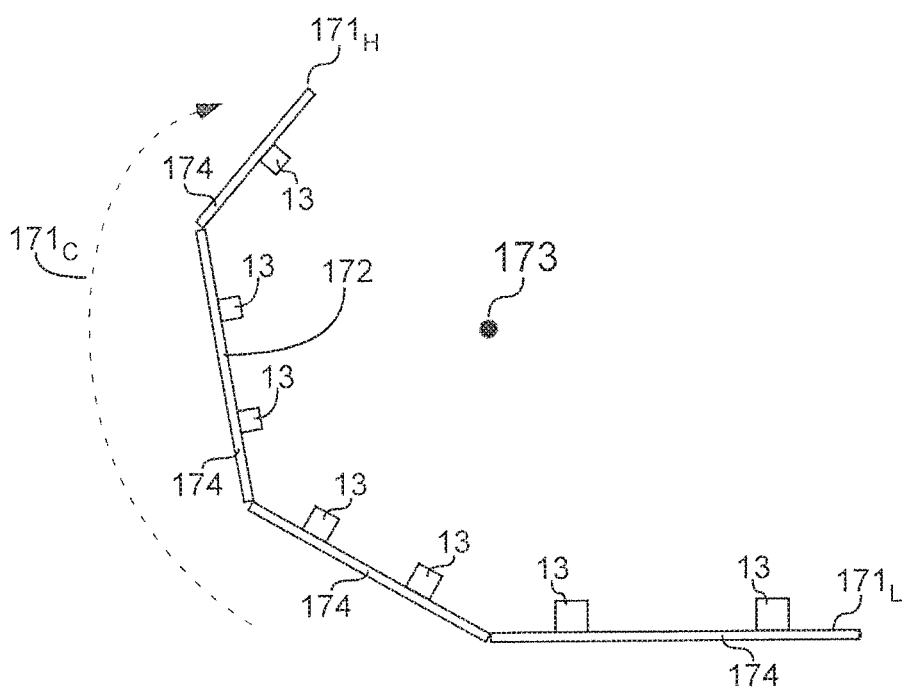

FIG. 17b is a schematic, end-view of a voltage multiplier 172, similar to voltage multiplier 171, except that whereas the curved shape of voltage multiplier 171 is continuous and smooth, the curved shape of voltage multiplier 172 is segmented—formed by multiple sections 174, in accordance with an embodiment of the present invention.

Figure 18:
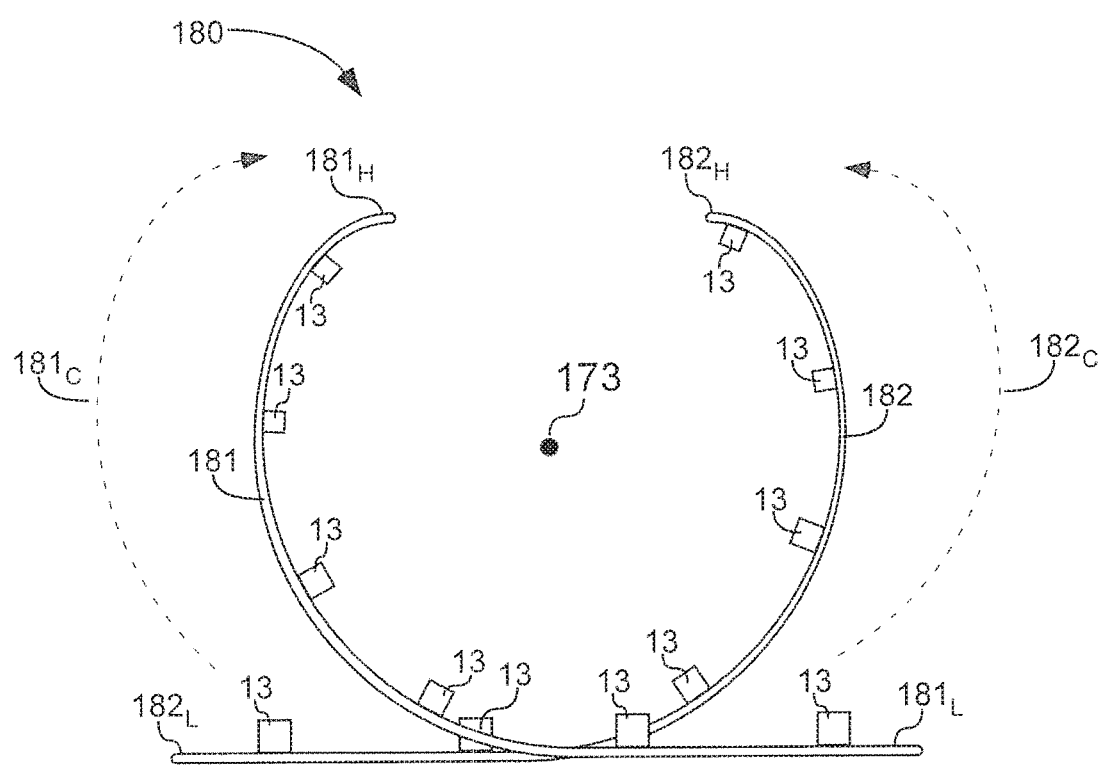

FIG. 18 is a schematic, end-view of a voltage multiplier 180, similar to voltage multipliers 171 or 172, voltage multiplier 180 including a negative voltage multiplier 181 with a primary curved shape having a direction $181_C$ of increasing absolute value of voltage and a positive voltage multiplier 182 with a secondary curved shape having a direction $182_C$ of increasing voltage, in accordance with an embodiment of the present invention.

Figure 19:
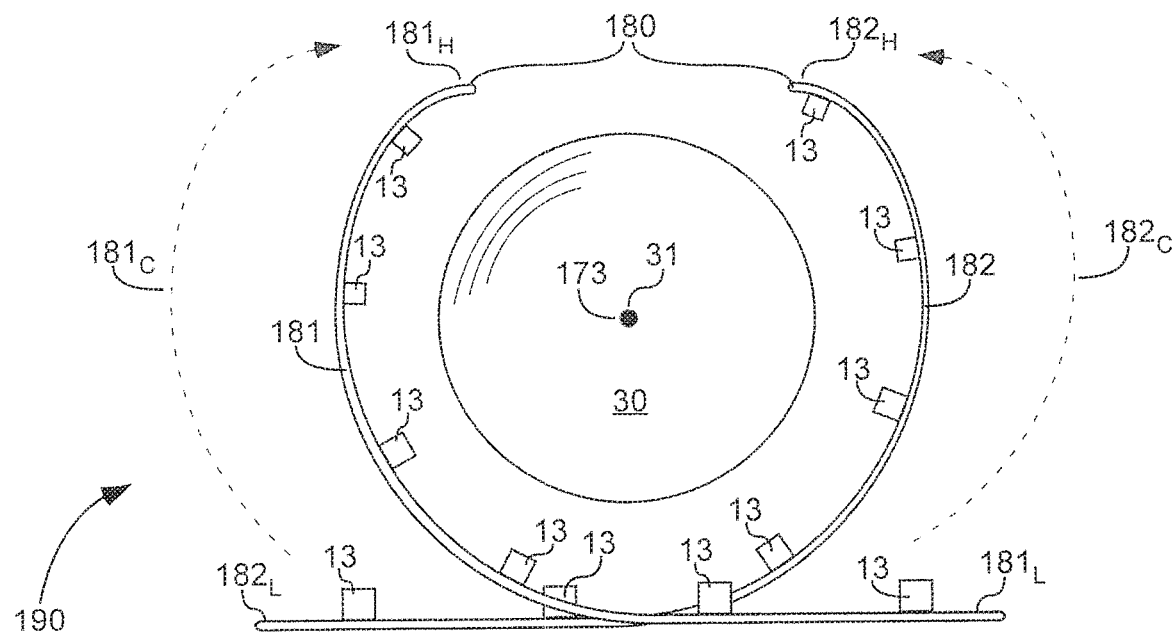

FIG. 19 is a schematic, end-view of an x-ray source 190 comprising an x-ray tube 30 and voltage multiplier 180, in accordance with an embodiment of the present invention.

Figure 20:
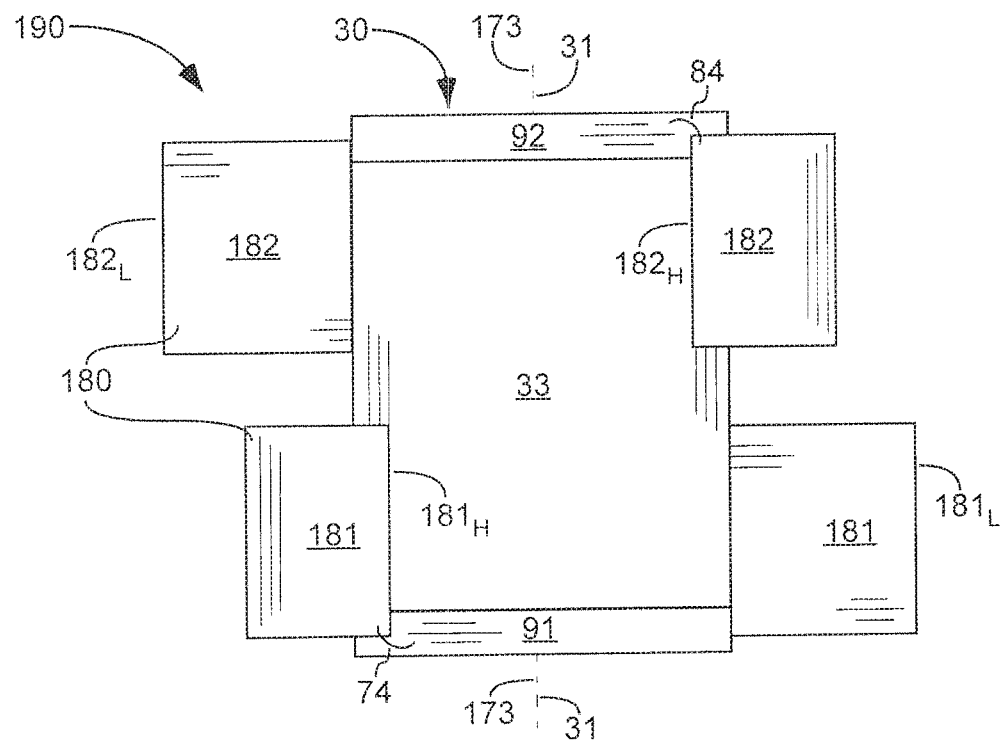

FIG. 20 is a schematic, top-view of x-ray source 190, in accordance with an embodiment of the present invention.

Figure 21:
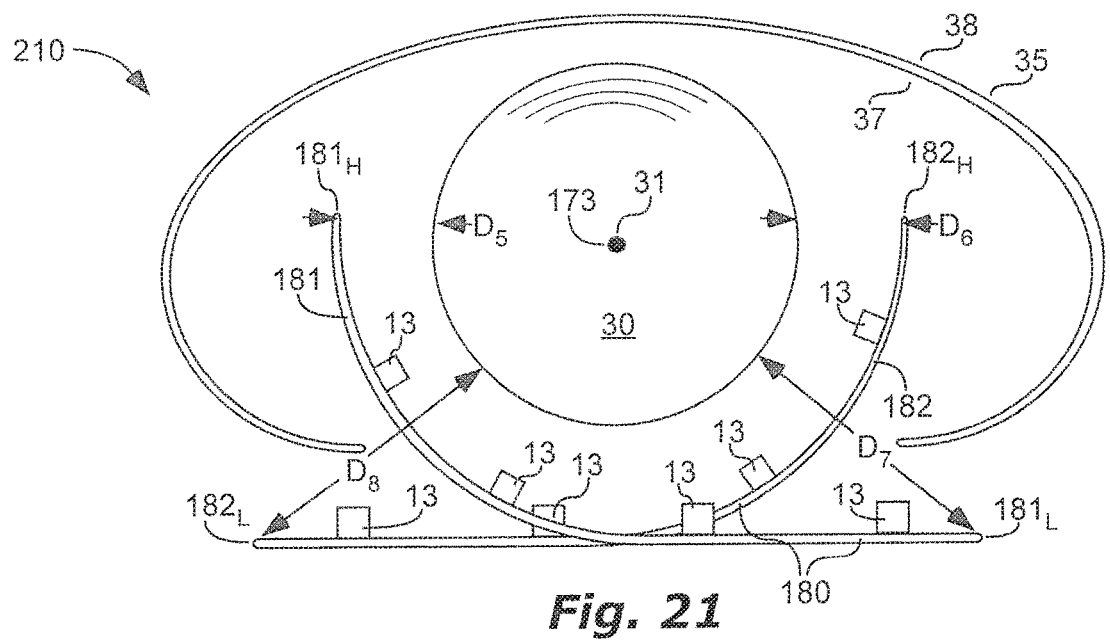

FIG. 21 is a schematic, end-view of an x-ray source 210, similar to x-ray source 190, but further comprising a corona guard 35 with a curved profile wrapping at least partially around the voltage multiplier 180 and the x-ray tube 30, in accordance with an embodiment of the present invention.

Figure 22:
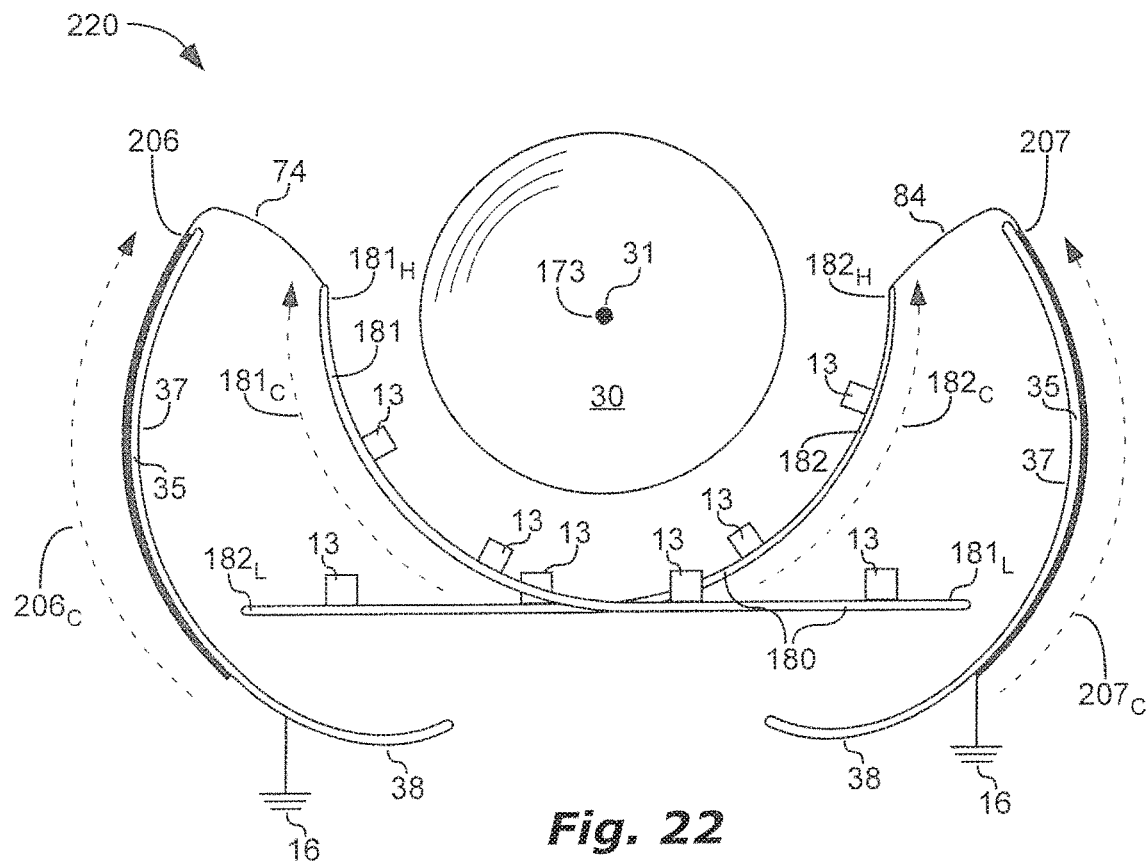

FIG. 22 is a schematic, end-view of an x-ray source 220, similar to x-ray source 210, but further comprising a negative voltage sensor 206 electrically coupled to the negative output bias voltage 74 and a positive voltage sensor 207 electrically coupled to the positive output bias voltage 84, both located on the convex side of the curved profile, in accordance with an embodiment of the present invention.

DEFINITIONS

As used herein, the term "aligned" includes exactly aligned, such that the items aligned are parallel, and also includes substantially aligned, such that the items aligned extend in roughly the same direction and are nearly parallel, such as for example within 10°, within 20°, or within 30° of parallel.

As used herein, the term "curved shape," with regard to a shape of the voltage multiplier, includes a continuous, smooth, curved shape (e.g., flexible circuit board, see FIG. 17a) and also includes a curved shape formed by multiple small sections hinged to form the curved shape (e.g. see sections 174 in FIG. 17b).

As used herein, the term "kV" means kilovolt(s).

As used herein, the terms "low voltage" and "high voltage" refer to an absolute value of the voltage, unless specified otherwise. Thus, both 20 kV and −20 kV would be "high voltage" relative to 2 kV and −2 kV.

As used herein, the term "V-shape" includes a shape with two lines tapering to a point or two planes tapering to a channel, and includes shapes with a larger internal angle than in a traditional V. Thus, although a traditional V has an internal angle of about 40°, the term "V-shape" as used herein includes similar shapes wherein the angle between the two lines or planes is ≥10° and ≤170°.

DETAILED DESCRIPTION

V-Shape

As illustrated in FIGS. 1-6, voltage multipliers are shown comprising a low voltage section 11 in a first plane $P_1$ and a high voltage section 12 in a second plane $P_2$. The first plane $P_1$ and the second plane $P_2$ can form a V-shape with an angle $A_1$ of a channel 19 of the V-shape. Examples of angle $A_1$ include a, ≥10°, ≥25°, ≥45°, ≥60°, ≥70°, ≥80°, or ≥90°, and ≤100°, ≤120°, ≤140°, ≤160°, ≤170°.

The low voltage section 11 can include a low voltage end $11_L$, with a lowest absolute value of voltage in the low voltage section 11, and a high voltage end $11_H$, with a highest absolute value of voltage in the low voltage section 11. The low voltage section 11 can generate a voltage differential between the low voltage end $11_L$ and the high voltage end $11_H$, such as for example a voltage differential of ≥500 volts, ≥1 kV, ≥10 kV, or ≥30 kV.

The high voltage section 12 can include a low voltage end $12_L$, with a lowest absolute value of voltage in the high voltage section 12, and a high voltage end $12_H$, with a highest absolute value of voltage in the high voltage section 12. The high voltage section 12 can generate a voltage differential between the low voltage end $12_L$ and the high voltage end $12_H$, such as for example a voltage differential of ≥500 volts, ≥1 kV, ≥10 kV, or ≥30 kV.

The high voltage end $11_H$ of the low voltage section 11 can provide input electrical power to the low voltage end $12_L$ of the high voltage section 12 (e.g. via electrical connection 15). The high voltage section 12 can provide output electrical power to a high voltage apparatus at an output bias voltage (represented by reference number 34). Examples of the output bias voltage 34 include an absolute value of ≥1 kV, ≥2 kV, ≥20 kV, or ≥60 kV.

As shown in FIGS. 3a-5, x-ray sources 30a, 30b, 40, and 50 can comprise voltage multiplier 10 plus an x-ray tube 30. The x-ray tube 30 can include two ends 42, one of which can be a cathode and the other an anode. The voltage multiplier 10 can be electrically coupled from the high voltage end $12_H$ of the high voltage section 12 to the x-ray tube 30, and can provide the output bias voltage 34 to one of the ends 42 of the x-ray tube 30. The voltage multiplier 10 can also be electrically coupled 36 from the low voltage end $11_L$ of the low voltage section 11 to the x-ray tube 30. This electrically coupling 36 can also be a connection to ground voltage 16 if the x-ray tube 30 is monopolar. References to a ground voltage 16 herein can be direct connections, or through other intermediate components, to the ground voltage 16.

The x-ray tube 30 can be located in the channel 19 of the V-shape of the voltage multiplier 10. An x-ray tube axis 31, extending from an electron emitter associated with the cathode to a target material associated with the anode, can be aligned with the channel 19 of the V-shape, as shown in FIGS. 3a-5.

The V-shape of the voltage multiplier 10, and alignment of the x-ray tube axis 31 with the channel 19 of the V-shape, can smooth electrical field gradients, thus allowing greater voltage standoff with reduced electrical insulation. Consequently, the x-ray source can be smaller and lighter for a given x-ray tube voltage rating.

Figure 1:
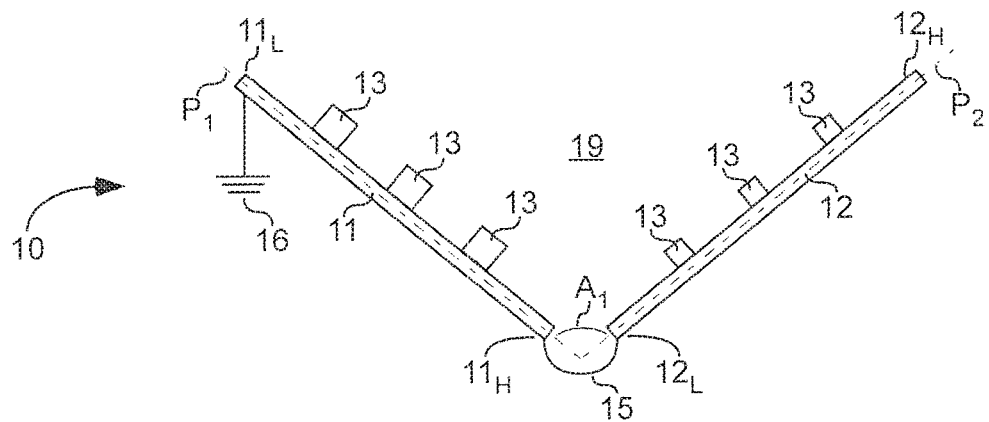
Figure 2:
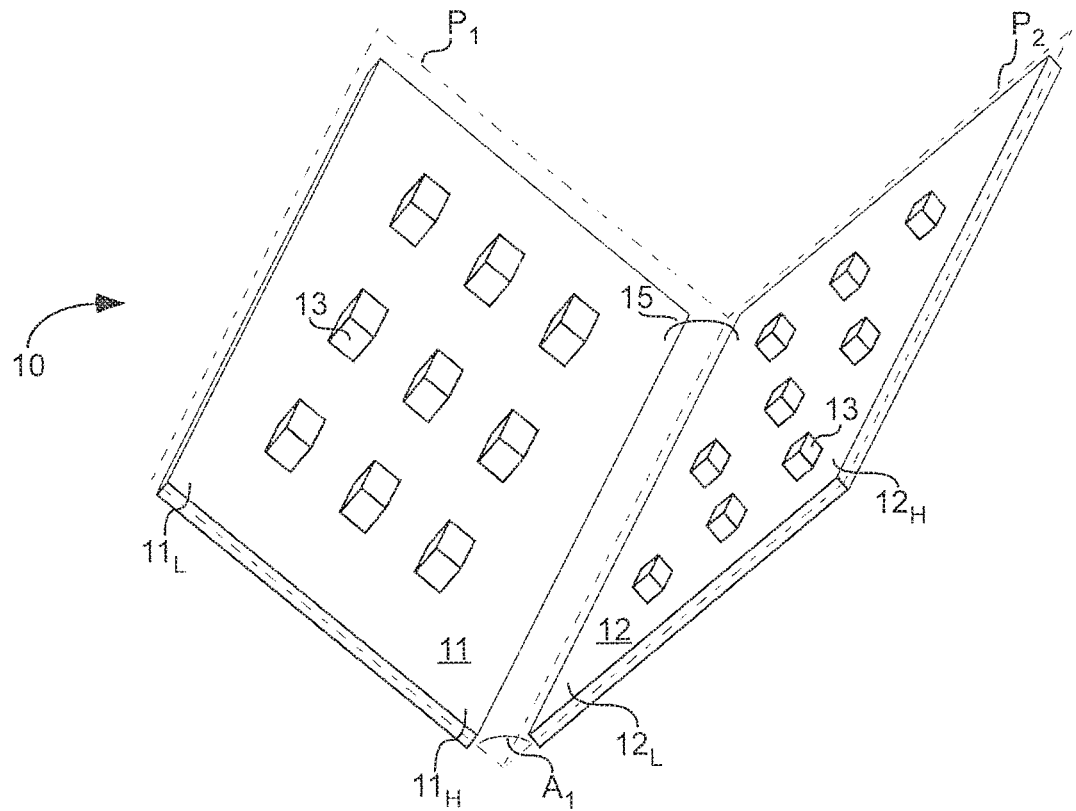
Figure 3A:
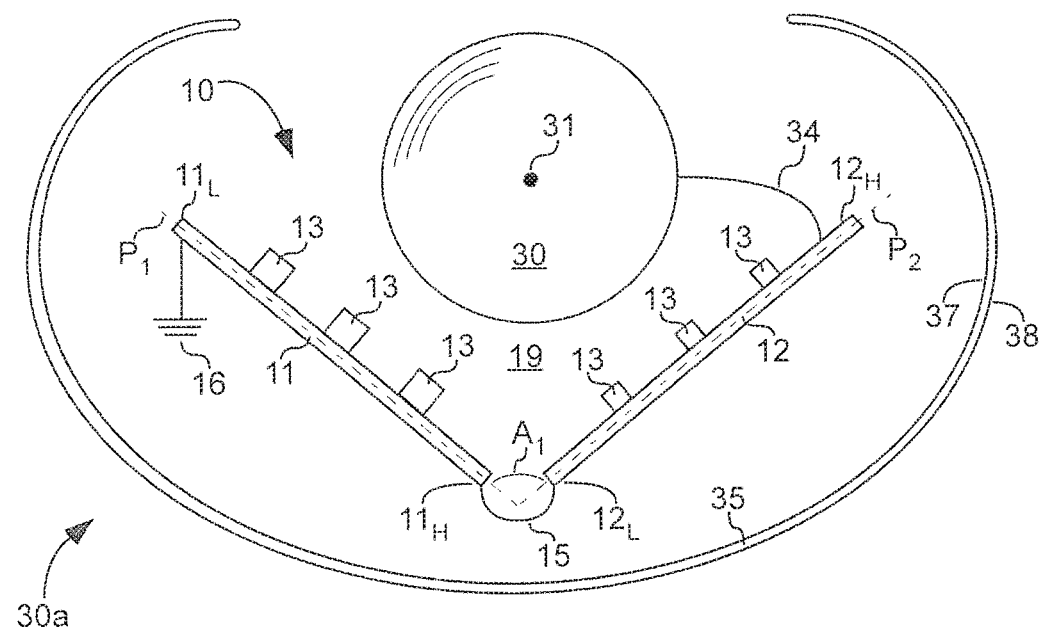
Figure 3B:
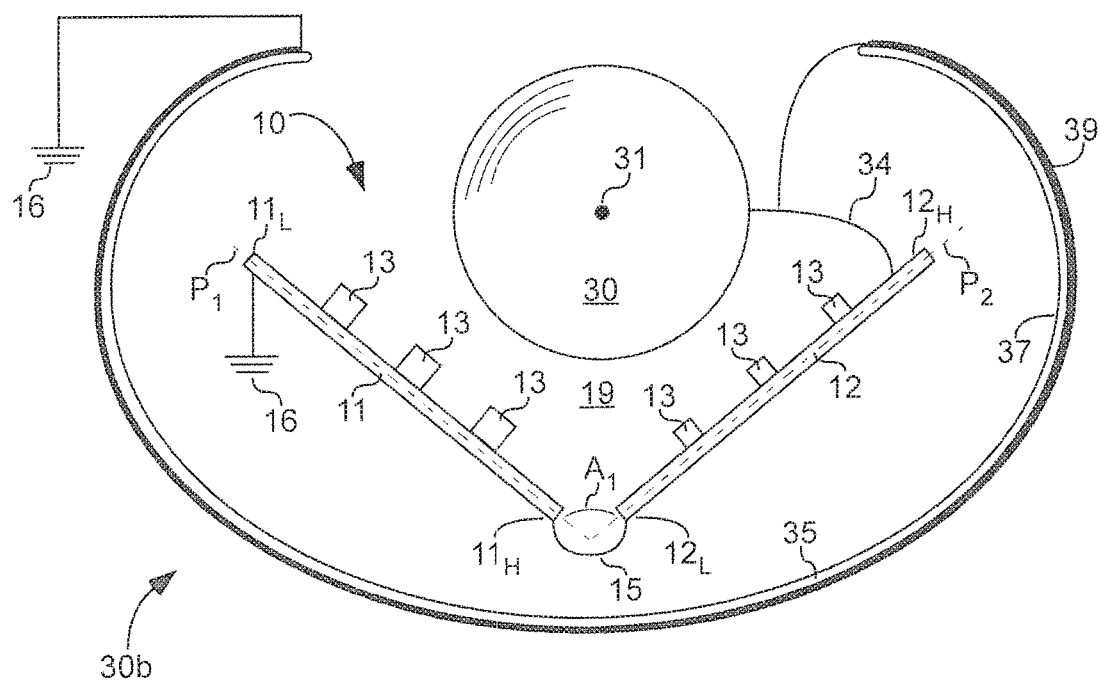
Figure 4:
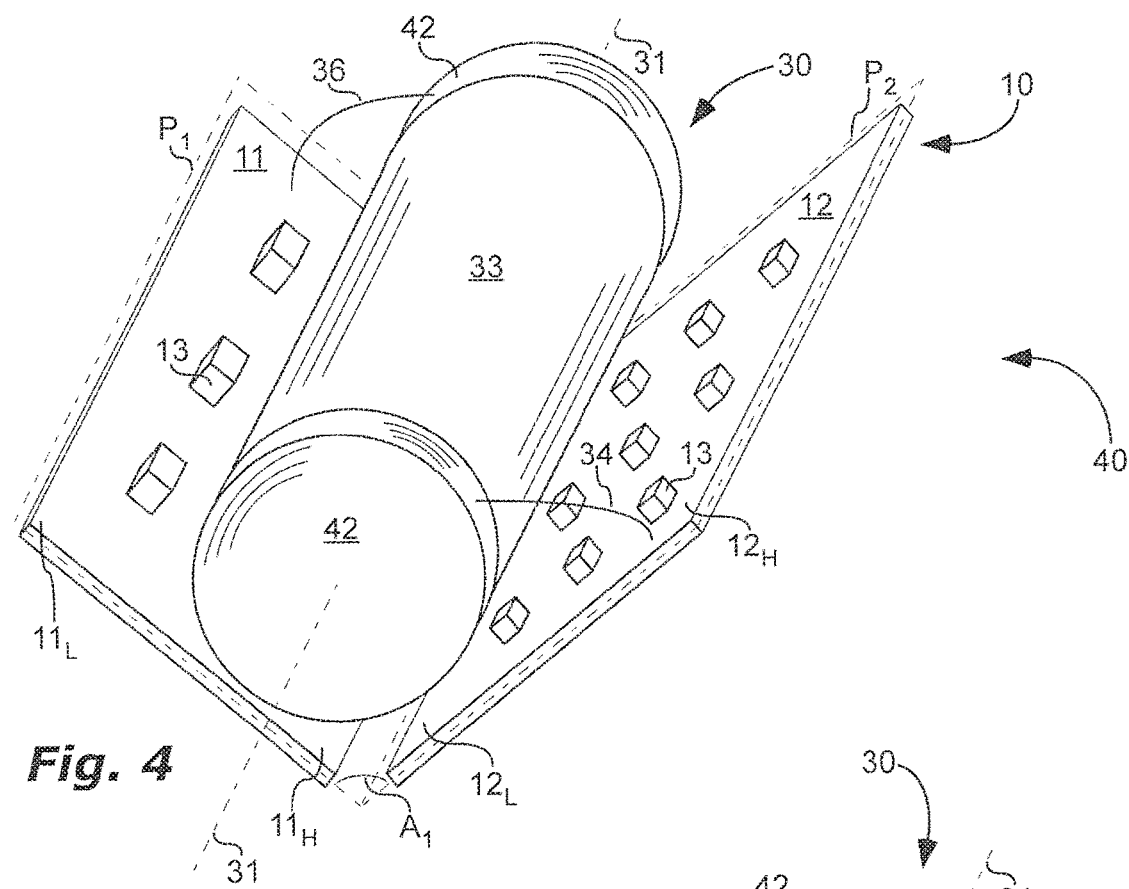

As shown in FIGS. 3a and 3b, the x-ray sources 30a and 30b can further comprise a corona guard 35. The corona guard 35 can include a curved profile. The curved profile can wrap at least partially around the voltage multiplier 10 and/or a curved, cylindrical shape of the x-ray tube 30. Thus for example, the curved profile can wrap ≥135°, ≥180°, ≥270°, or ≥315° of a 360° circumference around the voltage multiplier 10 and/or a curved, cylindrical shape of the x-ray tube 30. For example, the curved profile of FIG. 3a wraps about 240° of the 360° circumference. The curved profile of the corona guard 35 is shown in FIGS. 3a-b with a consistent cross-sectional shape along x-ray tube axis 31. The curved profile, however, can have a narrowing profile or shape (similar to a conical shape) for space saving and improved electrical field gradients. For example, the curved profile of the corona guard 35 can be closer to the x-ray tube 30 or the voltage multiplier 10 near lower voltages and farther away near higher voltages.

The corona guard 35 can have a material at a concave side of the curved profile with an electrical resistivity of $\geq 10^5$ Ω*m, $\geq 10^7$ Ω*m, $\geq 10^9$ Ω*m, or $\geq 10^{11}$ Ω*m. This material can be or can include ceramic. A material at a convex side of the curved profile can have a lower electrical resistivity than the material at the concave side. This provides an electrically-insulative surface facing the voltage multiplier to reduce the chance of arcing and a surface with higher electrical conductivity at the convex side for shaping and smoothing electrical field gradients. Thus, for example, an electrical resistivity of the material at the concave side of the curved profile divided by an electrical resistivity of the material at the convex side of the curved profile can be $\geq 10^4$, $\geq 10^6$, $\geq 10^8$, $\geq 10^{10}$, $\geq 10^{12}$, or $\geq 10^{14}$.

As shown in FIG. 3b, one option for the material at the convex side is a voltage sensor 39. This provides the dual benefit of providing a material with a lower electrical resistivity than the material at the concave side and saves space. Voltage-sensing resistors take valuable space, especially in portable x-ray sources, and saving this space can be a substantial benefit. Another problem with standard voltage-sensing resistors is that they typically have a rectangular shape, with corners where electrical field gradients can be high, thus increasing the chance of arcing failure. Putting such voltage-sensing resistors 39 on the smooth curved profile can help avoid such arcing failure. The voltage-sensing resistor 39 can be a dielectric ink painted on the convex side. Other possibilities for the voltage-sensing resistor 39 include wire that can be attached to the convex side or a trace of a metal (e.g. Ag, Au, Cu) attached to the convex side.

The voltage-sensing resistor 39 can wrap around a substantial portion of the voltage multiplier 10 and/or a curved, cylindrical shape of the x-ray tube 30, such as for example ≥135°, ≥180°, ≥270°, or ≥315° of a 360° circumference of the voltage multiplier 10 and/or a curved, cylindrical shape of the x-ray tube 30. For example, the curved profile of the voltage-sensing resistor 39 of FIG. 3b wraps about 240° of a 360° circumference around the voltage multiplier 10 and the curved, cylindrical shape of the x-ray tube 30.

Figure 5:
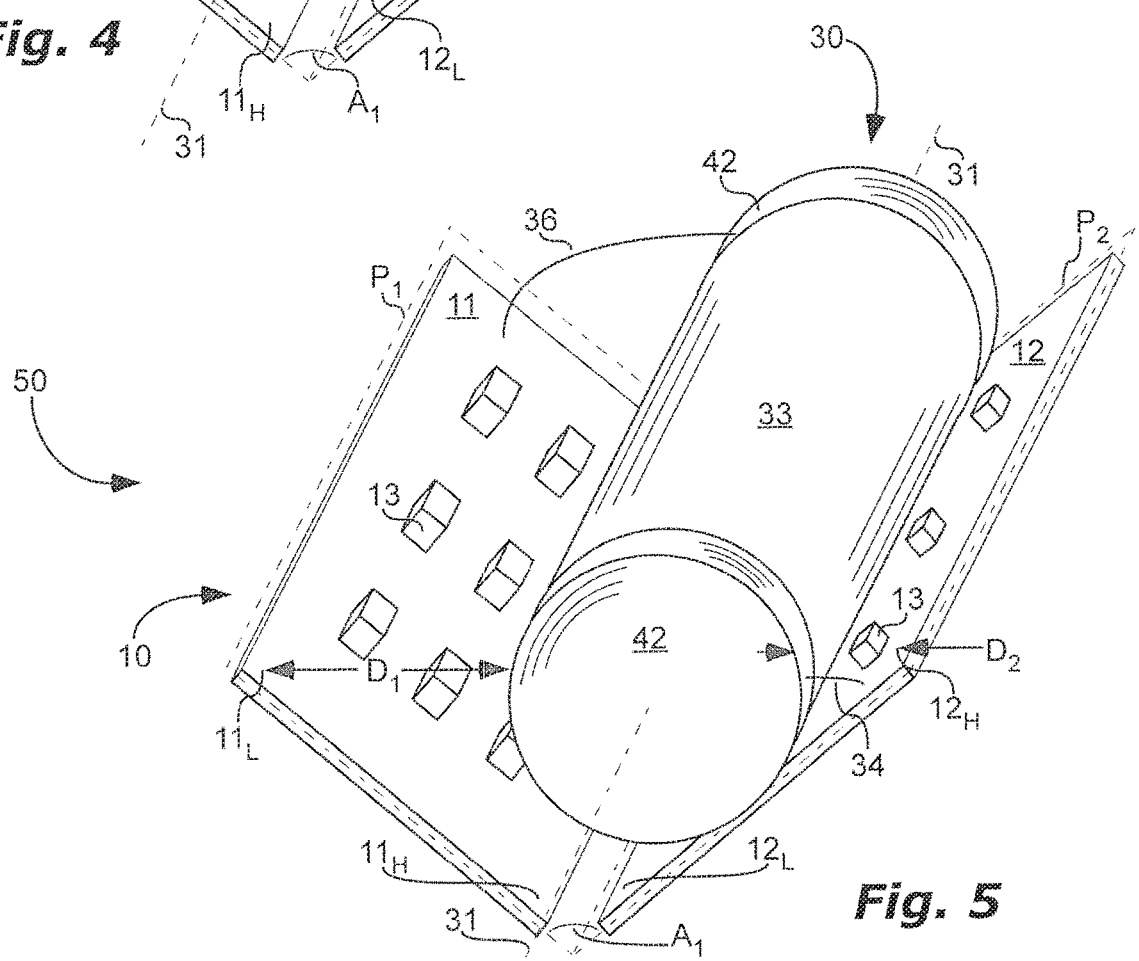

As shown in FIG. 5, to further smooth electrical field gradients and to reduce the chance of arcing failure, the x-ray tube 30 can be shifted towards the high voltage end $12_H$ of the high voltage section 12. Thus, a location on the low voltage section 11 having a lowest absolute value of voltage (e.g. low voltage end $11_L$) can be ≥1.5 times farther, ≥2 times farther, ≥3 times farther, or ≥4 times farther from the x-ray tube 30 than a location on the high voltage section 12 having a highest absolute value of voltage (e.g. high voltage end $12_H$). In other words, $D_1/D_2 \geq 1.5$, $D_1/D_2 \geq 2$, $D_1/D_2 \geq 3$, or $D_1/D_2 \geq 4$, where $D_1$ is a distance between the low voltage end $11_L$ of the low voltage section 11 and the x-ray tube 30, and $D_2$ is a distance between the high voltage end $12_H$ of the high voltage section 12 and the x-ray tube 30. In one embodiment, the high voltage end $12_H$ of the high voltage section 12 can directly contact: the x-ray tube 30. The term "directly contact" of the prior sentence means that the electronic component(s) of the high voltage end $12_H$ touch the x-ray tube 30, not merely that a wire electrically connects the high voltage end $12_H$ to the x-ray tube 30. Thus, $D_1/D_2$ can equal infinity if $D_2=0$.

Figure 6:
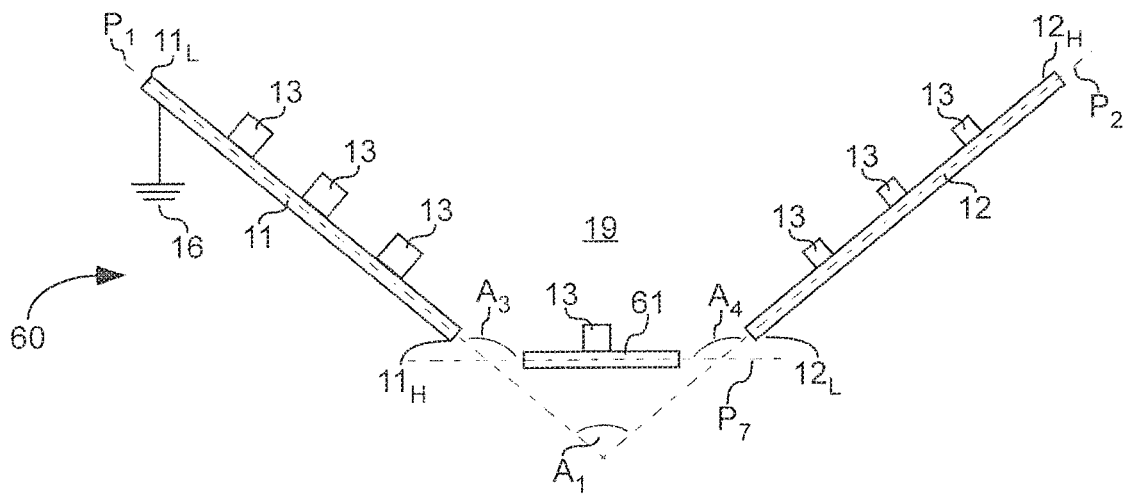
Figure 7A:
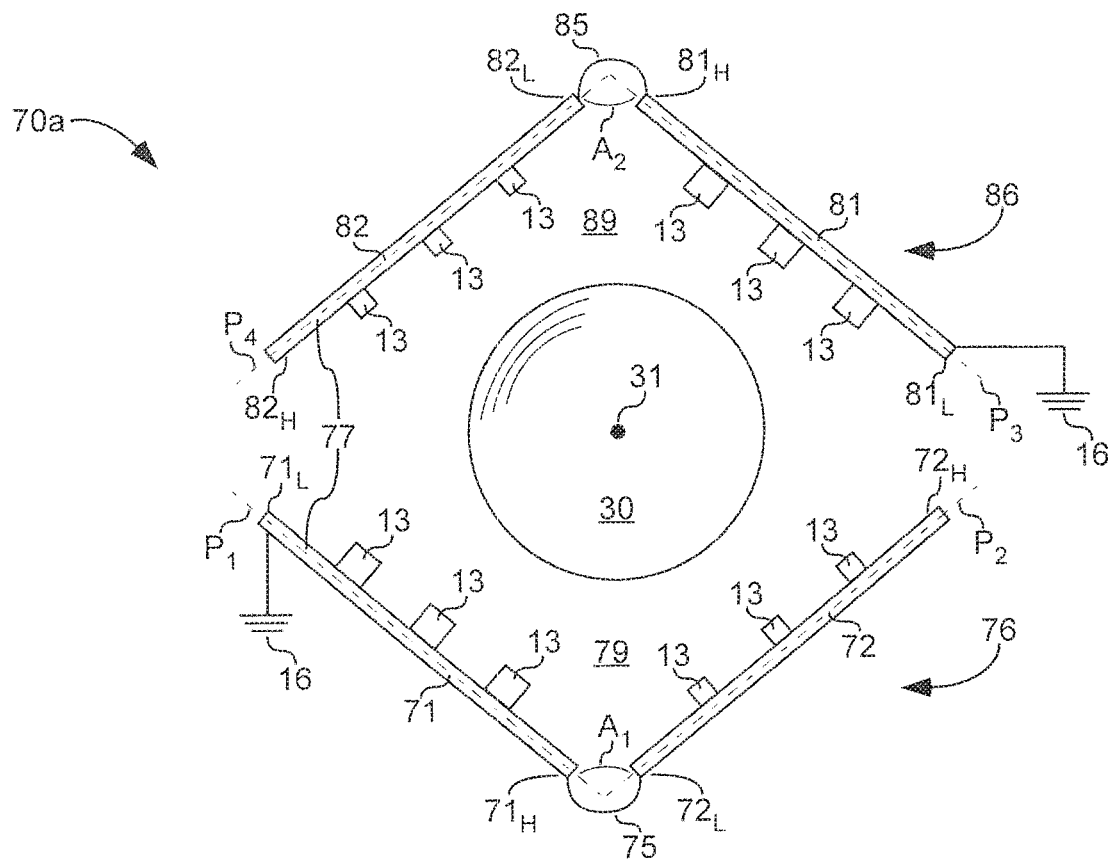
Figure 7B:
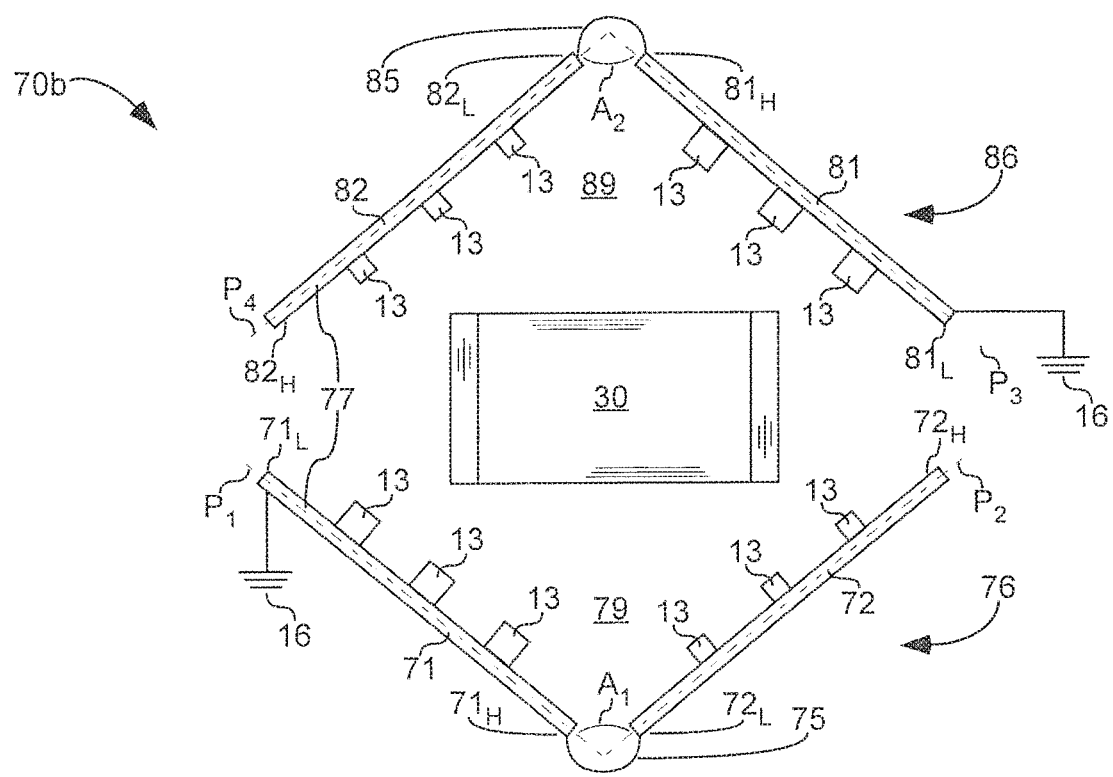

As shown in FIG. 6, voltage multiplier 60 can be similar to voltage multiplier 10 with a first plane $P_1$ of a low voltage section 11 and a second plane $P_2$ of a high voltage section 12 forming a V-shape, but further comprising a middle voltage section 61 electrically coupled between the low voltage section 11 and the high voltage section 12. The middle voltage section 61 can receive input electrical power from the high voltage end $11_H$ of the low voltage section 11, can produce ≥500 volts, ≥1 kV, or ≥10 kV of absolute value of bias voltage, and can provide input electrical power to the low voltage end $12_L$ of the high voltage section 12. Thus for example, the high voltage end $11_H$ of the low voltage section 11 and the low voltage end $12_L$ of the high voltage section 12 can have the same voltage, or have a voltage differential of ≤0.1 volt, ≤1 volt, ≤10 volts, or ≤100 volt, as shown in FIGS. 1-5, or the high voltage end $11_H$ of the low voltage section 11 and the low voltage end $12_L$ of the high voltage section 12 can have a voltage differential of ≥500 volts, ≥1 kV, or ≥10 kV, as shown in FIG. 6.

The middle voltage section 61 can be located in a seventh plane $P_7$. The seventh plane $P_7$ can be different from the first plane $P_1$, and the second plane $P_2$. An angle $A_3$ between the seventh plane $P_7$ and the first plane $P_1$ and an angle $A_4$ between the seventh plane $P_7$ and the second plane $P_2$, both located on a same side of the seventh plane $P_7$, can each have the same value or different values, and such values can be of ≥5°, ≥15°, ≥30°, ≥60°, or ≥90° and ≤110°, ≤130°, ≤150°, ≤170°, or ≤175°.

X-ray sources 70, 80, and 100 in FIGS. 7a-10 can comprise an x-ray tube 30 and voltage multiplier 77. Voltage multiplier 77 can include a negative voltage multiplier 76 and a positive voltage multiplier 86, each of which can have characteristics of voltage multipliers 10 and 60 described above.

The negative voltage multiplier 76 can include a negative low voltage section 71 in a first plane $P_1$ and a negative high voltage section 72 in a second plane $P_2$. The first plane $P_1$ and the second plane $P_2$ can form a primary V-shape with an angle $A_1$ of a channel 79 of the primary V-shape, with values of angle $A_1$ as described above.

The negative low voltage section 71 can include a negative low voltage end $71_L$, with a lowest absolute value of voltage in the negative low voltage section 71, and a negative high voltage end $71_H$, with a highest absolute value of voltage in the negative low voltage section 71. The negative low voltage section 71 can generate a voltage differential between the negative low voltage end $71_L$ and the negative high voltage end $71_H$, such as for example a voltage differential of ≥500 volts, ≥1 kV, ≥10 kV, or ≥30 kV.

The negative high voltage section 72 can include a negative low voltage end $72_L$, with a lowest absolute value of voltage in the negative high voltage section 72, and a negative high voltage end $72_H$, with a highest absolute value of voltage in the negative high voltage section 72. The negative high voltage section 72 can generate a voltage differential between the negative low voltage end $72_L$ and the negative high voltage end $72_H$, such as for example a voltage differential of a ≥500 volts, ≥1 kV, ≥10 kV, or ≥30 kV.

The negative high voltage end $71_H$ of the negative low voltage section 11 can provide input electrical power to the negative low voltage end $72_L$ of the negative high voltage section 72. The negative high voltage section 72 can be electrically coupled to and can provide output electrical power to a cathode 91 of the x-ray tube 30 at a negative output bias voltage (represented by reference number 74). Examples of the negative output bias voltage 74 include ≤−1 kV, ≤−2 kV, ≤−20 kV, or ≤−60 kV.

The positive voltage multiplier 86 can include a positive low voltage section 81 in a third plane $P_3$ and a positive high voltage section 12 in a fourth plane $P_4$. The third plane $P_3$ and the fourth plane $P_4$ can form a secondary V-shape with an angle $A_2$ of a channel 89 of the secondary V-shape. Examples of angle $A_2$ include a ≥10°, ≥25°, ≥45°, ≥60°, ≥70°, ≥80°, or ≥90°, and ≤100°, ≤120°, ≤140°, ≤160°, ≤170°.

The positive low voltage section 81 can include a positive low voltage end $81_L$, with a lowest voltage in the positive low voltage section 81, and a positive high voltage end $81_H$, with a highest voltage in the positive low voltage section 81. The positive low voltage section 81 can generate a voltage differential between the positive low voltage end $81_L$ and the positive high voltage end $81_H$, such as for example a voltage differential of ≥500 volts, ≥1 kV, ≥10 kV, or ≥30 kV.

The positive high voltage section 82 can include a positive low voltage end $82_L$, with a lowest voltage in the positive high voltage section 82, and a positive high voltage end $82_H$, with a highest voltage in the positive high voltage section 82. The positive high voltage section 82 can generate a voltage differential between the positive low voltage end $82_L$ and the positive high voltage end $82_H$, such as for example a voltage differential of ≥500 volts, ≥1 kV, ≥10 kV, or ≥30 kV.

The positive high voltage end $81_H$ of the positive low voltage section 81 can provide input electrical power to the positive low voltage end $82_L$ of the positive high voltage section 82. The positive high voltage section 82 can be electrically coupled to and can provide output electrical power to an anode 92 of the x-ray tube 30 at a positive output bias voltage (represented by reference number 84). Examples of the positive output bias voltage 84 include ≥1 kV, ≥2 kV, ≥20 kV, or ≥60 kV.

Voltage multiplier 77 can be useful for bipolar devices such as bipolar x-ray tubes. The negative voltage multiplier 76, the positive voltage multiplier 86, and the x-ray tube 31 can be oriented to minimize electrical field gradients. The x-ray tube 30 can be located in a channel 79 of the primary V-shape and in a channel 89 of the secondary V-shape. Also, For example, as illustrated on x-ray sources 70a and 80 of FIGS. 7a, 8, and 9 the x-ray tube axis 31, extending from an electron emitter associated with the cathode 91 to a target material associated with the anode 92, can be aligned with the channel 79 of the primary V-shape and with the channel 89 of the secondary V-shape. Alternatively, as illustrated on x-ray source 70b of FIG. 7b, the x-ray tube axis 31 can be misaligned with the channel 79 and the channel 89. A choice between these designs can be made based on overall x-ray source enclosure limitations and required x-ray source voltage.

Figure 8:
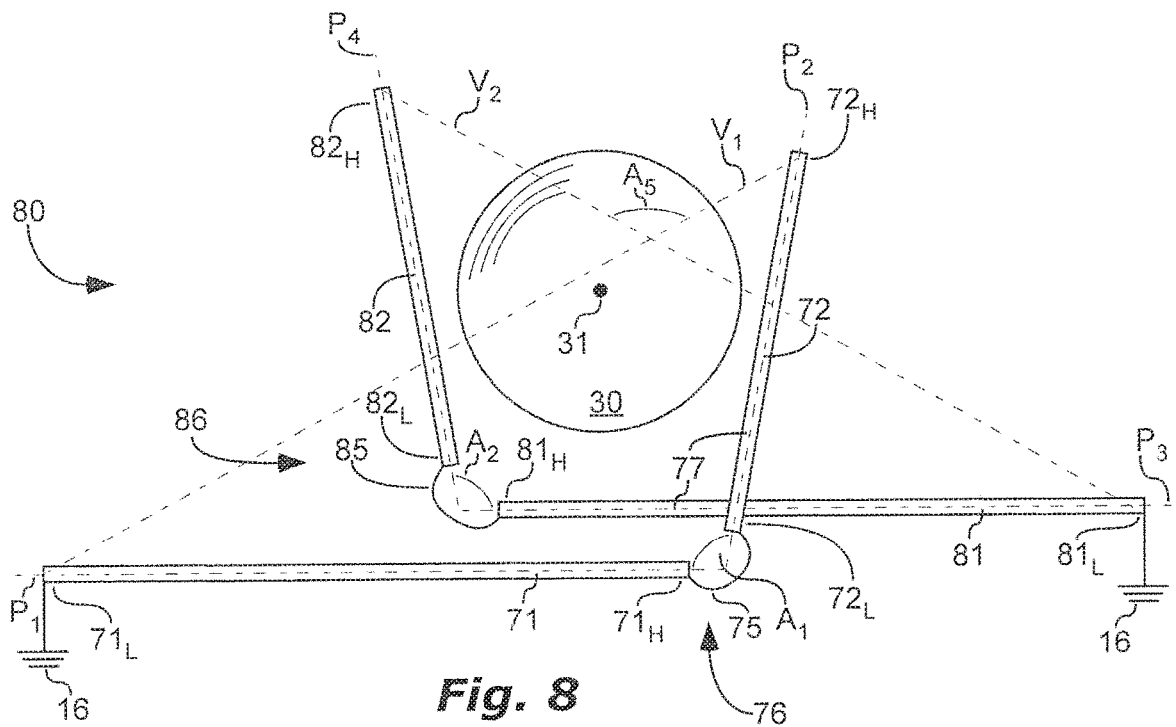
FIG. 8 is a schematic, end-view of an x-ray source 80, similar to x-ray source 70, but further comprising a first vector $V_1$, a second vector $V_2$, and an angle $A_5$ between the first vector $V_1$ and the second vector $V_2$, in accordance with an embodiment of the present invention.
Figure 9:
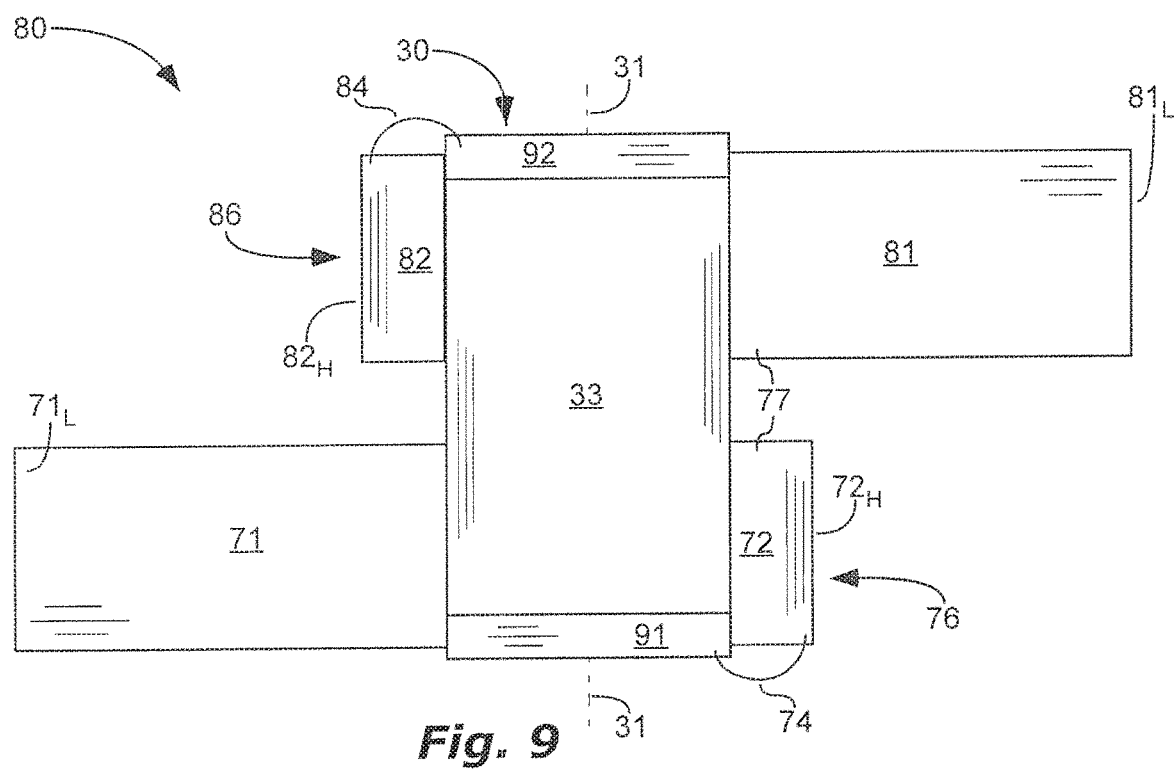
FIG. 9 is a schematic, top-view of x-ray source 80, in accordance with an embodiment of the present invention.

Another example of a design for minimizing electrical field gradients is x-ray source 80 in FIGS. 8-9 with a negative voltage multiplier 76, a positive voltage multiplier 86, and an x-ray tube 31 with structure as described above, but oriented differently. Vectors will be used to describe its orientation. A first vector $V_1$ can extend from a location (e.g. negative low voltage end $71_L$) on the negative low voltage section 71 having a lowest absolute value of voltage to a location (negative high voltage end $72_H$) on the negative high voltage section 72 having a highest absolute value of voltage. A second vector $V_2$ can extend from a location (e.g. positive low voltage end $81_L$) on the positive low voltage section 81 having a lowest voltage to a location (positive high voltage end $82_H$) on the positive high voltage section 82 having a highest voltage. An angle $A_5$ between the first vector $V_1$ and the second vector $V_2$, viewed parallel to the x-ray tube axis 31, can be ≥45°, ≥70°, ≥90°, or ≥110°; and can be ≤120°, ≤150°, or ≤170°.

Other examples of designs for minimizing electrical field gradients are x-ray sources 100a and 100b in FIGS. 10a-b, which are similar to those described previously, but modified as follows. The first plane $P_1$ and the third plane $P_3$ can be oriented to be parallel, as shown in FIG. 10, or can be oriented to intersect with an angle of ≤3°, ≤5°, ≤10°, ≤20°, or ≤30°. As another example, the second plane $P_2$ and the fourth plane $P_4$ can be parallel or can intersect with an angle $A_6$ of ≤150°, ≤110°, ≤90°, ≤50°, ≤25°.

A negative voltage-sensing resistor 107 can be electrically coupled between the negative output bias voltage 74 and ground voltage 16, the negative voltage-sensing resistor 107 located in a fifth plane $P_5$. A positive voltage-sensing resistor 108 can be electrically coupled between the positive output bias voltage 84 and ground voltage 16, the positive voltage-sensing resistor 108 located in a sixth plane $P_6$.

As shown in FIG. 10a, the negative low voltage section 71, the negative high voltage section 72, the positive low voltage section 81, the positive high voltage section 82, the negative voltage-sensing resistor 107, and the positive voltage-sensing resistor 108 can encircle the x-ray tube 30. As shown in FIGS. 10a-b, the first plane $P_1$, the second plane $P_2$, the third plane $P_3$, the fourth plane $P_4$, the fifth plane $P_5$, and the sixth plane $P_6$ can encircle the x-ray tube 30.

Another example of minimizing electrical field gradients is to locate the negative output bias voltage 74 and the positive output bias voltage 84 on opposite sides of the x-ray tube 30. Located on opposite sides of the x-ray tube 30 means that a straight line 105, between the negative high voltage end $72_H$ of the negative high voltage section 72 and the positive high voltage end $82_H$ of the positive high voltage section 82, must pass through the x-ray tube 30.

X-Shape

Voltage multiplier 116, shown in FIGS. 11-16, includes a negative voltage multiplier 111 and a positive voltage multiplier 112. The negative voltage multiplier 111 can multiply an input electrical voltage to produce a negative output bias voltage 74 having values of for example ≤−500 volts, ≤−1 kV, ≤−2 kV, or ≤−10 kV. The negative voltage multiplier 111 can have an end with a lowest absolute value of voltage, defining a negative low voltage end 111, and an end with a highest absolute value of voltage, defining a negative high voltage end $111_H$. The positive voltage multiplier 112 can multiply an input electrical voltage to produce a positive output bias voltage 84 having a value of for example ≥500 volts, ≥1 kV, ≥2 kV, or ≥10 kV. The positive voltage multiplier 112 can have an end with a lowest voltage, defining a positive low voltage end $112_L$, and an end with a highest voltage, defining a positive high voltage end $112_H$. The negative voltage multiplier 111 and the positive voltage multiplier 112 can be inclined at different angles with respect to each other such that an end view of the voltage multipliers forms an X-shape by intersection of a plane $P_N$ of the negative voltage multiplier 111 and a plane $P_P$ of the positive voltage multiplier 112.

Voltage multiplier 116 can be combined with an x-ray tube 30 to form x-ray sources 110 (FIGS. 11-12), 130 (FIG. 13), 140 (FIG. 14), and 150 (FIGS. 15a-16). The x-ray tube 30 can be located in a channel 119 of the X-shape. In order to reduce electrical field gradients, the negative voltage multiplier 111 can be electrically coupled to a cathode 91 of the x-ray tube 30; can be located closer to the cathode 91 than the positive voltage multiplier 112; and can provide electrical power to the cathode 91 at the negative output bias voltage 74. Also, the positive voltage multiplier 112 can be electrically coupled to an anode 92 of the x-ray tube 30; can be located closer to the anode 92 than the negative voltage multiplier 111; and can provide electrical power to the anode 92 at the positive output bias voltage 84.

In order to reduce electrical field gradients, the x-ray tube axis 31, from an electron emitter associated with the cathode 91 to a target material associated with the anode 92, can be aligned with the channel 119 of the X-shape. An angle of the channel 119 of the X-shape can be ≥5°, ≥15°, ≥30°, ≥45°, ≥60°, or ≥80° and can be ≤100°, ≤120°, ≤140°, ≤160°, or ≤170°.

As shown in FIG. 11, to further smooth electrical field gradients and to reduce the chance of arcing failure, the x-ray tube 30 can be shifted towards the negative high voltage end $111_H$ and/or towards the positive high voltage end $112_H$. For example, the negative low voltage end $111_L$ can be ≥1.5 times farther, ≥2 times farther, ≥3 times farther, or ≥4 times farther from the x-ray tube 30 than the negative high voltage end $111_H$. The positive low voltage end $112_L$ can be ≥1.5 times farther, ≥2 times farther, ≥3 times farther, or ≥4 times farther from the x-ray tube 30 than the positive high voltage end $112_H$.

In other words, $D_3/D_4 \geq 1.5$, $D_3/D_4 \geq 2$, $D_3/D_4 \geq 3$, or $D_3/D_4 \geq 4$; and/or $D_5/D_6 \geq 1.5$, $D_5/D_6 \geq 2$, $D_5/D_6 \geq 3$, or $D_5/D_6 \geq 4$; where $D_3$ is a distance between the negative low voltage end $111_L$ and the x-ray tube 30, $D_4$ is a distance between the negative high voltage end $111_H$ and the x-ray tube 30, $D_5$ is a distance between the positive low voltage end $112_L$ and the x-ray tube 30, and $D_6$ is a distance between the positive high voltage end $112_H$ and the x-ray tube 30.

In one embodiment, the negative high voltage end $111_H$ and/or the positive high voltage end $112_H$ can directly contact the x-ray tube 30. The term "directly contact" of the prior sentence means that the electronic component(s) of the negative high voltage end $111_H$ and/or the positive high voltage end $112_H$ touch the x-ray tube 30, not merely that a wire electrically connects the negative high voltage end $111_H$ and/or the positive high voltage end $112_H$ to the x-ray tube 30. Thus, $D_3/D_4$ can equal infinity if $D_4=0$ and $D_5/D_6$ can equal infinity if $D_6=0$.

As shown in FIG. 13, in order to reduce electrical field gradients, the low voltage ends $111_L$ and $112_L$ can be closer to each other than the high voltage ends $111_H$ and $112_H$ are to each other. Thus, for example a distance $D_H$ between the positive high voltage end $112_H$ and the negative high voltage end $111_H$ can be ≥2 times, ≥3 times, ≥4 times, or ≥5 times a distance $D_L$ between the positive low voltage end $112_L$ and the negative low voltage end $111_L$.

As shown in FIGS. 13-15b, the negative voltage multiplier 111 and the positive voltage multiplier 112 can intersect in the end view. As shown in FIG. 14, a length $L_1$ or $L_2$ of each leg of the negative voltage multiplier 111 in the X-shape can be ≥5%, ≥10%, ≥10%, or ≥20% of a total length $(L_1+L_2)$ of the negative voltage multiplier 111. A length $L_3$ or $L_4$ each leg of the positive voltage multiplier 112 in the X-shape can be ≥5%, ≥10%, ≥10%, or ≥20% of a total length $(L_3+L_4)$ of the positive voltage multiplier 112.

As shown in FIGS. 15a-16, a corona guard 35 can have a curved profile. The curved profile can wrap at least partially around the negative voltage multiplier 111, the positive voltage multiplier 112, and/or a curved, cylindrical shape of the x-ray tube 30. Thus for example, the curved profile can wrap ≥135°, ≥180°, ≥270°, or ≥315° of a 360° circumference around the negative voltage multiplier 111, the positive voltage multiplier 112, and/or the curved, cylindrical shape of the x-ray tube 30. For example, the curved profile of FIGS. 15a and 15b wraps about 290° of the 360° circumference. The curved profile of the corona guard 35 is shown in FIGS. 15a-16 with a consistent cross-sectional shape along x-ray tube axis 31. The curved profile, however, can have a narrowing shape profile or shape (similar to a conical shape) for space saving and improved electrical field gradients. For example, the curved profile of the corona guard 35 can be closer to the x-ray tube 30 or the voltage multiplier 10 near lower voltages and farther away near higher voltages.

The corona guard 35 can have a material at a concave side of the curved profile with an electrical resistivity of $\geq 10^5$ $\Omega*m$, $\geq 10^7$ $\Omega*m$, or $\geq 10^{11}$ $\Omega*m$. This material can be or can include ceramic. A material at a convex side of the curved profile can have a lower electrical resistivity than the material at the concave side. This provides an electrically-insulative surface facing the voltage multiplier to reduce the chance of arcing and a surface with relatively higher electrical conductivity at the convex side for shaping and smoothing electrical field gradients. Thus, for example, an electrical resistivity of the material at the concave side of the curved profile divided by an electrical resistivity of the material at the convex side of the curved profile can be $\geq 10^4$, $\geq 10^6$, $\geq 10^8$, $\geq 10^{10}$, $\geq 10^{12}$, or $\geq 10^{14}$.

One option for the material at a convex side is a negative voltage sensor 159 electrically coupled to the negative output bias voltage 74 and/or a positive voltage sensor 169 electrically coupled to the positive output bias voltage 84. This provides the dual benefit of providing a material with a lower electrical resistivity than the material at the concave side and saves space. Voltage-sensing resistors take valuable space, especially in portable x-ray sources, and saving this space can be a substantial benefit. Another problem with standard voltage-sensing resistors is that they typically have a rectangular shape, with corners where electrical field gradients can be high, thus increasing the chance of arcing failure. Putting such voltage-sensing resistors 159 and 169 on the smooth curved profile can help avoid such arcing failure.

The voltage-sensing resistors 159 and 169 can be a dielectric ink painted on the convex side. The voltage-sensing resistors 159 and 169 can wrap around a substantial portion of the voltage multiplier 116 and/or the curved, cylindrical shape of the x-ray tube 30, such as for example ≥135°, ≥180°, ≥270°, or ≥315° of the 360° circumference of the voltage multiplier 10 and/or the curved, cylindrical shape of the x-ray tube 30. For example, the curved profile of the voltage-sensing resistors 159 and 169 of FIGS. 15*a* and 15*b* wraps about 290° of the 360° circumference, Curved Shape As shown in FIGS. 17*a*-17*b*, voltage multipliers 171 and 172 can include a first end $171_L$ having a lowest absolute value of voltage and a second end $171_H$ having a highest absolute value of voltage. There can be a gradually increasing absolute value of voltage from the first end $171_L$ to the second end $171_H$. The voltage multiplier 171 or 172 can multiply an input electrical voltage to produce an output bias voltage, having an absolute value of or example ≥1 kV, ≥2 kV, ≥10 kV, or ≥30 kV, between the first end $171_L$ and the second end $171_H$.

The voltage multipliers 171 and 172 can include a curved shape. A direction $171_C$ of the increasing absolute value of voltage can wrap in the curved shape at least partially around an axis, defining a voltage multiplier axis 173. Thus for example, the curved shape can wrap ≥45°, ≥90°, ≥135°, ≥180°, ≥270°, or ≥315° of a 360° circumference around the voltage multiplier axis 173. For example, the curved shapes of FIGS. 17*a* and 17*b* wrap about 150° of the 360° circumference.

The curved profile of the corona guard 35 and the curved shape of the voltage multipliers 171, 172, 181, and 182 in FIGS. 17*a*-22 are shown with a consistent cross-sectional shape along the voltage multiplier axis 173 and the x-ray tube axis 31. The curved profile and the curved shape, however, can have a narrowing profile or shape (similar to a conical shape) for space saving and improved electrical field gradients. For example, the curved profile of the corona guard 35, the curved shape of the voltage multipliers 171, 172, 181, or both can be closer to the x-ray tube 30 near lower voltages and farther away near higher voltages.

The curved shape can form a "C" shape. The curved shape can be continuous and smooth, such as with a flexible circuit board, as shown in FIG. 17*a*. Alternatively, the curved shape can be formed by multiple small sections 174 hinged to form the curved shape, as shown in FIG. 17*b*. For example, a hinged, curved shape, like that of FIG. 17*b* can include ≥4 sections 174, ≥6 sections 174, ≥8 sections 174, ≥10 sections 174, or ≥20 sections 174. In one embodiment, every junction or hinge between each pair of adjacent sections 174 can bend the sections 174 inward towards the voltage multiplier axis 173, as shown in FIG. 17*b*.

An x-ray tube 30 can be located on a concave side of the curved shape. The output bias voltage can be electrically coupled to the x-ray tube 30. The voltage multiplier axis 173 can be aligned with the x-ray tube axis 31.

The voltage multiplier 180 of FIGS. 18-22 is similar to voltage multipliers 171 and 172, except that voltage multiplier 180 includes both a negative voltage multiplier 181 and a positive voltage multiplier 182. The negative voltage multiplier 181 can multiply an input electrical voltage from a first end $181_L$ having a lowest absolute value of voltage, to a second end $181_H$ having a highest absolute value of voltage, with a gradually increasing absolute value of voltage from the first terminal $181_L$ to the second terminal $181_H$, to provide ≤−1 kV, ≤−2 kV, ≤−10 kV, or −30 kV of negative output bias voltage 74.

The negative voltage multiplier 181 can include a primary curved shape with a direction $181_C$ of the increasing absolute value of voltage wrapping in the primary curved shape at least partially around the voltage multiplier axis 173. Thus for example, the primary curved shape can wrap ≥45°, ≥90°, ≥135°, ≥180°, ≥270°, or ≥315° of a 360° circumference around the voltage multiplier axis 173.

The positive voltage multiplier 182 can multiply an input electrical voltage from a first terminal $182_L$ having a lowest voltage, to a second terminal $182_H$ having a highest voltage, with a gradually increasing voltage from the first terminal $182_L$ to the second terminal $182_H$, to provide ≥1 kV, ≥2 kV, ≥10 kV, or ≥30 kV of positive output bias voltage 84.

The positive voltage multiplier 182 can include a secondary curved shape with a direction $182_C$ of the increasing voltage wrapping in the secondary curved shape at least partially around the voltage multiplier axis 173. Thus for example, the secondary curved shape can wrap ≥45°, ≥90°, ≥135°, ≥180°, ≥270°, or ≥315° of a 360° circumference around the voltage multiplier axis 173.

As shown in FIGS. 19-22, x-ray sources 190, 210, and 220 can comprise an x-ray tube 30 and voltage multiplier 180. The x-ray tube 30 can be located on a concave side of the primary curved shape and/or on a concave side of the secondary curved shape. The negative voltage multiplier 181 can be electrically coupled to and can provide electrical power at the negative output bias voltage 74 to a cathode 91 of the x-ray tube 30. The positive voltage multiplier 182 can be electrically coupled to and can provide electrical power at the positive output bias voltage 84 to an anode 92, of the x-ray tube 30. The voltage multiplier axis 173 can be aligned with the x-ray tube axis 31, the x-ray tube axis 31 extending from an electron emitter associated with the cathode 91 to a target material associated with the anode 92.

A shown in FIG. 21, the first end $181_L$ can be ≥1.5 times farther, ≥2 times farther, ≥3 times farther, or ≥4 times farther than the second end $181_H$ from the x-ray tube 30. The first terminal $182_L$ can be ≥1.5 times farther, ≥2 times farther, ≥3 times farther, or ≥4 times farther than the second terminal $182_H$ from the x-ray tube 30. This design can reduce electrical field gradients and can reduce the risk of arcing failure.

A shown in FIGS. 21-22, a corona guard 35 can include a curved profile. The curved profile can be aligned with the x-ray tube axis 31 and/or the voltage multiplier axis 173. The curved profile can wrap at least partially around the voltage multiplier 180 and/or a curved, cylindrical shape of the x-ray tube 30. Thus for example, the curved profile can wrap ≥135°, ≥180°, ≥270°, or ≥315° of a 360° circumference around the voltage multiplier 180 and/or a curved, cylindrical shape of the x-ray tube 30.

The corona guard 35 can have a material at a concave side of the curved profile with a high electrical resistivity and/or a material at a convex side of the curved profile with a lower electrical resistivity as described above. One option for the material at a convex side is a negative voltage sensor 206 electrically coupled to the negative output bias voltage 74 and/or a positive voltage sensor 207 electrically coupled to the positive output bias voltage 84. This provides benefits as described above with voltage-sensing resistors 159 and 169.

For improved shaping of electrical fields, a direction $206_C$ of increasing absolute value of voltage in the negative voltage sensor 181 can align with the direction $181_C$ of increasing absolute value of voltage in the primary curved shape, and/or a direction $207_C$ of increasing voltage in the positive voltage sensor 182 can align with the direction $182_C$ of increasing voltage in the secondary curved shape.

The voltage-sensing resistors 206 and 207 can be a dielectric ink painted on the convex side. The voltage-sensing resistors 206 and 207 can wrap around a substantial portion of the voltage multiplier 180 and/or the curved, cylindrical shape of the x-ray tube 30, such as for example ≥135°, ≥180°, ≥270°, or ≥315° of a 360° circumference.

For improved shaping of electrical field gradients, as shown in FIGS. 21-22, the second end $181_H$ of the negative voltage multiplier 181 and the second terminal $182_H$ of the positive voltage multiplier 182 can be located on opposite sides of the x-ray tube 30. Also, the primary curved shape or the secondary curved shape can wrap clockwise around the voltage multiplier axis 173 as viewed from an end of the voltage multiplier axis 173 and the other of the primary curved shape or the secondary curved shape can wrap counterclockwise around the voltage multiplier axis 173.

Reliability of the voltage multipliers described herein can be improved while also minimizing size and cost, by using different sized electronic components 13, such as capacitors and/or diodes, at different locations on the voltage multiplier. Larger electronic components 13 (e.g. capacitors/diodes with a higher voltage rating) can be used at or closer to a lowest voltage end and smaller electronic components 13 (e.g. capacitors/diodes with a lower voltage rating) can be used at or closer to a highest voltage end. Thus, the figures show two or three different sized electronic components 13 which can be capacitors or diodes. For example, for voltage multipliers in FIGS. 1-10, the low voltage section 11 can include capacitors and/or diodes with a voltage rating that is ≥10% higher than capacitors and/or diodes of the high voltage section 12. As another example, for voltage multipliers in FIGS. 11-14, the negative low voltage end $111_L$ can include capacitors and/or diodes with a voltage rating that is ≥10% higher than capacitors and/or diodes at the negative high voltage end $111_H$; and the positive low voltage end $112_L$ can include capacitors and/or diodes with a voltage rating that is ≥10% higher than capacitors and/or diodes at the positive high voltage end $112_H$. As another example, for voltage multipliers in FIGS. 15-22, the voltage multiplier can include capacitors and/or diodes closest to the first end $171_L$ with a voltage rating that is ≥10% higher than capacitors and/or diodes closest to the second end $171_H$.

The voltage multipliers described herein can be any voltage multiplier/generator capable of receiving an input voltage and multiplying that voltage to generate ≥1 kV of output voltage. For example, the voltage multipliers described herein can be a Cockcroft-Walton multipliers/generators; the voltage multipliers described herein can be half wave or full wave. The electronic components in the figures are shown on a side of the circuit board facing the channel 19, 79, and 89 of the V-shape, the x-ray tube axis 31, the channel 119 of the X-shape, and the voltage multiplier axis 173, but these electronic components can be located on an opposite side of the circuit board or on both sides of the circuit board.

What is claimed is:

1. A voltage multiplier configured to multiply an input electrical voltage to produce an output bias voltage having an absolute value of ≥2 kV, the voltage multiplier comprising:

a low voltage section located in a first plane and a high voltage section located in a second plane;

the first plane and the second plane forming a V-shape with an angle of a channel of the V-shape being ≥60° and ≤170°;

the low voltage section configured to produce ≥1 kV absolute value of bias voltage and providing input electrical power to the high voltage section; and the high voltage section configured to produce ≥1 kV absolute value of bias voltage and providing output electrical power to a high voltage apparatus at the output bias voltage.

2. The voltage multiplier of claim 1, further comprising:

a corona guard including a curved profile, the curved profile wrapping at least partially around the voltage multiplier; and an electrical resistivity of a material at a concave side of the curved profile divided by an electrical resistivity of a material at a convex side of the curved profile being ≥$10^6$.

3. The voltage multiplier of claim 1, further comprising:

a middle voltage section electrically coupled between the low voltage section and the high voltage section;

the middle voltage section configured to produce ≥1 kV absolute value of bias voltage and providing input electrical power to the high voltage section;

the middle voltage section located in a seventh plane, the seventh plane being different from the first plane and the second plane; and an angle between the seventh plane and the first plane and an angle between the seventh plane and the second plane, both located on a same side of the seventh plane, both have a value of ≥70° and ≤170°.

4. The voltage multiplier of claim 1, further comprising:

the V-shape is a primary V-shape, the voltage multiplier is a negative voltage multiplier, the output bias voltage is a negative output bias voltage, the low voltage section is a negative low voltage section, and the high voltage section is a negative high voltage section;

a positive voltage multiplier configured to multiply an input electrical voltage to produce a positive output bias voltage of ≥2 kV, the positive voltage multiplier comprising: a positive low voltage section located in a third plane and a positive high voltage section located in a fourth plane; the third plane and the fourth plane forming a secondary V-shape with an angle of an opening of the secondary V-shape being ≥60° and ≤170°; the positive low voltage section configured to produce ≥1 kV of bias voltage and providing input electrical power to an input of the positive high voltage section; and the positive high voltage section configured to produce ≥1 kV of bias voltage and configured to provide the positive output bias voltage.

5. The voltage multiplier of claim 4, wherein the first plane and the third plane are parallel or intersect with an angle of ≤10°.

6. The voltage multiplier of claim 4, further comprising:

a negative voltage sensing resistor electrically coupled between the negative output bias voltage and ground voltage, the negative voltage sensing resistor located in a fifth plane; and a positive voltage sensing resistor electrically coupled between the positive output bias voltage and ground voltage, the positive voltage sensing resistor located in a sixth plane.

7. The voltage multiplier of claim 4, wherein the second plane and the fourth plane are parallel or intersect with an angle of ≤90°.

8. A voltage multiplier comprising:
a negative voltage multiplier configured to multiply an input electrical voltage to produce a negative output bias voltage having a value of ≤−2 kV, the negative voltage multiplier having an end with a lowest absolute value of voltage, defining a negative low voltage end, and an end with a highest absolute value of voltage, defining a negative high voltage end;
a positive voltage multiplier configured to multiply an input electrical voltage to produce a positive output bias voltage having a value of ≤2 kV, the positive voltage multiplier having an end with a lowest voltage, defining a positive low voltage end, and an end with a highest voltage, defining a positive high voltage end; and
the negative voltage multiplier and the positive voltage multiplier inclined at different angles with respect to each other such that an end view of the voltage multipliers forms an X-shape by intersection of a plane of the negative voltage multiplier and a plane of the positive voltage multiplier.

9. The voltage multiplier of claim 8, wherein:
the negative low voltage end includes capacitors with a voltage rating that is ≥10% higher than capacitors at the negative high voltage end;
the negative low voltage end includes diodes with a voltage rating that is ≥10% higher than diodes at the negative high voltage end;
the positive low voltage end includes diodes with a voltage rating that is ≥10% higher than diodes at the positive high voltage end; and
the positive low voltage end includes capacitors with a voltage rating that is ≥10% higher than capacitors at the positive high voltage end.

10. The voltage multiplier of claim 8, wherein a distance between the positive high voltage end and the negative high voltage end is ≥3 times a distance between the positive low voltage end and the negative low voltage end.

11. The voltage multiplier of claim 8, wherein the voltage multipliers intersect in the end view with:
a length each leg of the negative voltage multiplier in the X-shape being ≥10% of a total length of the negative voltage multiplier; and
a length each leg of the positive voltage multiplier in the X-shape being ≥10% of a total length of the positive voltage multiplier on each side of the X-shape.

12. The voltage multiplier of claim 8, wherein an angle of a channel of the X-shape is ≥60° and ≤120°.

13. The voltage multiplier of claim 8, further comprising:
a corona guard including a curved profile, the curved profile wrapping ≥partially around the negative voltage multiplier and the positive voltage multiplier; and
an electrical resistivity of a material at a concave side of the curved profile divided by an electrical resistivity of a material at a convex side of the curved profile being ≥$10^6$.

14. The voltage multiplier of claim 8, further comprising:
a corona guard;
the corona guard including a curved profile wrapping at least partially around the negative voltage multiplier and the positive voltage multiplier;
the corona guard having a material at a concave side of the curved profile with an electrical resistivity of ≥$10^5$ Ω*m; and
a voltage sensor electrically coupled to the output bias voltage and located on a convex side of the curved profile;
a negative voltage sensor electrically coupled to the negative output bias voltage and located on a convex side of the curved profile; and
a positive voltage sensor electrically coupled to the positive output bias voltage and located on the convex side of the curved profile.

15. A voltage multiplier configured to multiply an input electrical voltage to produce an output bias voltage having an absolute value of ≥2 kV, the voltage multiplier comprising:
a first end having a lowest absolute value of voltage and a second end having a highest absolute value of voltage, a gradually increasing absolute value of voltage from the first end to the second end, the voltage multiplier configured to produce ≥2 kV of absolute value bias voltage between the first end and the second end; and
a curved shape with a direction of the increasing absolute value of voltage wrapping in the curved shape at least partially around an axis, defining a voltage multiplier axis.

16. The voltage multiplier of claim 15, further comprising:
a corona guard including a curved profile, the curved profile wrapping at least partially around the voltage multiplier; and
an electrical resistivity of a material at a concave side of the curved profile divided by an electrical resistivity of a material at a convex side of the curved profile being ≥$10^6$.

17. The voltage multiplier of claim 15, further comprising:
a corona guard;
the corona guard including a curved profile wrapping at least partially around the voltage multiplier;
the corona guard having a material at a concave side of the curved profile with an electrical resistivity of ≥$10^5$ Ω*m; and
a voltage sensor electrically coupled to the output bias voltage and located on a convex side of the curved profile.

18. The voltage multiplier of claim 15, further comprising:
the voltage multiplier is a negative voltage multiplier, the output bias voltage is a negative output bias voltage of ≤−2 kV, and the curved shape is a primary curved shape;
a positive voltage multiplier, the positive voltage multiplier: configured to multiply an input electrical voltage from a first terminal having a lowest voltage, to a second terminal having a highest voltage, with a gradually increasing voltage from the first terminal to the second terminal, to provide ≥2 kV of positive output bias voltage; and including a secondary curved shape with a direction of the increasing voltage wrapping in the secondary curved shape at least partially around the voltage multiplier axis.

19. The voltage multiplier of claim 15, wherein the primary curved shape or the secondary curved shape wraps clockwise around the voltage multiplier axis as viewed from an end of the voltage multiplier axis and the other of the primary curved shape or the secondary curved shape wraps counterclockwise around the voltage multiplier axis.

20. The voltage multiplier of claim 15, further comprising:
- a corona guard;
- the corona guard including a curved profile wrapping at least partially around the negative voltage multiplier and the positive voltage multiplier;
- the corona guard having a material at a concave side of the curved profile with an electrical resistivity of $\geq 10^5$ $\Omega\text{*m}$;
- a negative voltage sensor electrically coupled to the negative output bias voltage and located on a convex side of the curved profile;
- a positive voltage sensor electrically coupled to the positive output bias voltage and located on a convex side of the curved profile;
- a direction of increasing absolute value of voltage in the negative voltage sensor aligns with the direction of the increasing absolute value of voltage in the primary curved shape; and
- a direction of increasing voltage in the positive voltage sensor aligns with the direction of the increasing voltage in the secondary curved shape.

* * * * *